US010282938B1

(12) United States Patent
Halvorson

(10) Patent No.: US 10,282,938 B1
(45) Date of Patent: May 7, 2019

(54) GAMING SYSTEM AND METHOD WITH A RESOURCE EFFICIENT SLIDE OUT GAME INFORMATION DISPLAY

(71) Applicant: ADP GAUSELMANN GMBH, Espelkamp (DE)

(72) Inventor: Michael Charles Halvorson, Las Vegas, NV (US)

(73) Assignee: ADP GAUSELMANN GMBH, Espelkamp (DE)

( * ) Notice: Subject to any disclaimer, the term of this patent is extended or adjusted under 35 U.S.C. 154(b) by 0 days.

(21) Appl. No.: 15/858,114

(22) Filed: Dec. 29, 2017

(51) Int. Cl.
*A63F 13/533* (2014.01)
*G07F 17/32* (2006.01)
*G07F 17/34* (2006.01)

(52) U.S. Cl.
CPC ...... *G07F 17/3213* (2013.01); *G07F 17/3216* (2013.01); *G07F 17/3244* (2013.01); *G07F 17/3267* (2013.01); *G07F 17/34* (2013.01)

(58) Field of Classification Search
CPC ............. G07F 17/3213; G07F 17/3216; G07F 17/3244; G07F 17/3267; G07F 17/34
USPC .............................................................. 463/20
See application file for complete search history.

(56) References Cited

U.S. PATENT DOCUMENTS 6,939,223 B1 9/2005 Jones
2002/0183105 A1* 12/2002 Cannon .................. G07F 17/32 463/16
2005/0282614 A1* 12/2005 Gauselmann ........... G07F 17/32 463/20
2006/0025215 A1* 2/2006 Thomas .............. G07F 17/3211 463/30
2006/0063587 A1* 3/2006 Manzo .................... G07F 17/32 463/25
2007/0270208 A1* 11/2007 Caspers .................. G07F 17/32 463/20
2009/0258697 A1* 10/2009 Kelly ................. G07F 17/3202 463/20
2011/0086706 A1* 4/2011 Zalewski ................ G06F 3/017 463/36

* cited by examiner

*Primary Examiner* — Allen Chan
(74) *Attorney, Agent, or Firm* — Resolute Legal PLLC

(57) ABSTRACT

Various embodiments of a gaming system and method are disclosed as having a slide out information area that can be displayed substantially simultaneously with a game on one display screen while efficiently using gaming system hardware resources. The slide out information area enables a player to easily access game information without leaving or interrupting a play of a game. The slide out information area also minimizes the need for the player to switch the player's gaze from the game screen to another screen.

19 Claims, 21 Drawing Sheets

GAMING SYSTEM AND METHOD WITH A RESOURCE EFFICIENT SLIDE OUT GAME INFORMATION DISPLAY

FIELD OF THE INVENTION

The present disclosure relates to gaming devices.

SUMMARY OF THE INVENTION

Various embodiments of a gaming system and method are disclosed as having a slide out information area that can be displayed substantially simultaneously with a game on one display screen while efficiently using gaming system hardware resources. The slide out information area enables a player to easily access game information without leaving or interrupting a play of a game. The slide out information area also minimizes the need for the player to switch the player's gaze from the game screen to another screen.

In one embodiment, the gaming system displays a game on a display screen. For example, the gaming system displays a virtual five-reel slot machine game (with three symbols positions per reel) on the display screen. The gaming system also includes a slide out information area that can be displayed on the same display screen as the game. The gaming system enables the player to open the slide out information area (e.g., through a swiping motion on a touch screen, by actuating a button, speaking a command, etc.) at any time before, during, or after a play of a game. Opening the slide out information area will not stop or otherwise interrupt a play of a game. In one embodiment, the slide out information area provides the player with symbol pay table information. In one embodiment, the slide out information area provides the player with other suitable game information such as jackpot information, player tracking information, awards, offers, etc. In some embodiments, the slide out information area provides the player a way to order different services. In some embodiments, the slide out information area provides an area for the player to play another game. It should therefore be appreciated that the slide out information area could be used to provide any suitable information to the player.

In one embodiment, the slide out information area displays a selection of some or all of the pay symbols (symbols that can result in awards or payouts) in the virtual five-reel slot machine game (e.g., a pay table). The gaming system enables the player to select any of the symbols used in a game to determine information about the symbols in the game. For example, if a cherry symbol is displayed in the slide out information area, selecting the cherry symbol may reveal additional information about the cherry symbol. In one embodiment, the additional information may include the different payout amounts for combinations of three cherries, four cherries, or five cherries along a wagered pay line. The gaming system may dynamically update the payout amounts shown in the slide out information area based on a player's wager amount. As another example, if a bonus trigger symbol is displayed in the slide out information area, selecting the bonus trigger symbol may reveal additional information about the bonus trigger symbol. For example, the information may include how the bonus trigger works in a gams to cause the game system to start a bonus round. At the same time the player is accessing data in the slide out information area, the player may also simultaneously play one or more games (including base or bonus games) displayed in the same display screen.

In one embodiment, a gaming system includes a set of symbols. The set of symbols includes a plurality of different symbols. During a play of a game, the gaming system randomly generates (or selects) a plurality of symbols from the set of symbols. The gaming system may display the generated plurality of symbols, for example, on virtual reels. The gaming system evaluates the generated plurality of symbols for winning symbol combinations. For example, the gaming system may evaluate if a predetermined quantity of certain symbols were generated in adjacent reel symbol positions across any wagered pay lines. If a predetermined quantity of a symbol was generated in adjacent reel symbol display positions across a wagered pay line, the gaming system may determine if the quantity of symbols matches a payout award in a pay table. The gaming system provides an appropriate payout award based on any generated winning symbol combinations and the pay table.

For some players, it may be difficult to track what value or function a symbol has in a game when the game uses many symbols. For some players new to a game, it may be difficult to remember the value of one or more symbols used in a game. Thus, the gaming system enables the player at any time during the play of the game (or before the play of the game or after the play of the game) to access a slide out information area to obtain more information about the game and the game symbols. In one embodiment, the gaming system enables the player to obtain the symbol pay information on the same screen as the game, without obscuring the game and without pausing or stopping the game (i.e., access to the slide out information area is made concurrently with a play of the game on the same game screen). For example, the gaming system may enable the player to select a game information button or to swipe to across a touch screen associated with the game screen to open or activate a slide out information area. In one embodiment where the gaming system provides symbol information, when the slide out information area opens, one or more symbols are displayed. The gaming system enables the player to select one or more of the displayed symbols and obtain information about the selected symbols while continuing to play a game.

It should therefore be appreciated that the slide out information area can be simultaneously displayed on the same display screen as the game without interrupting a play of a game and while efficiently using gaming system hardware resources. In this manner, the gaming system provides a new way for a player to quickly understand bow different symbols function in a game or the value of symbols in a game without having to leave or interrupt the game. In some embodiments, the gaming system also provides a new way for a player to quickly obtain other information about a game, obtain help, or obtain services without leaving, pausing, or otherwise stopping a game. Moreover, because the game information can be displayed on the same screen as a game while the game is played, the player can review both the game screen and the information in the slide out information area without requiting the player to shift focus or eve contact as would be necessary for game information displayed on a separate screen and further from a game.

DETAILED DESCRIPTION OF TOE INVENTION

Various embodiments of a gaming system and method are disclosed as having a slide out information area that can be displayed simultaneously with a game on one display screen while efficiently using gaming system hardware resources. The slide out information area enables a player to easily access game information without leaving or interrupting a play of a game. The slide out information area also eliminates the need for the player to switch the player's gaze from the game screen to another screen.

In one embodiment, the gaming system displays a game on a display screen. For example, the gaming system displays a virtual five-reel slot machine game (with three symbols positions per reel) on the display screen. The gaming system also includes a slide out information area that can be displayed on the same display screen as the game. The gaming system enables the player to open the slide out information area (e.g., through a swiping motion on a touch screen, by actuating a button, speaking a command, etc.) at any time before, during, or after a play of a game. Opening the slide out information area will not stop or otherwise interrupt a play of a game. In one embodiment, the slide out information area provides the player with symbol pay table information. In one embodiment, the slide out information area provides the player with other suitable game information such as jackpot information, player tracking information, awards, offers, etc. In some embodiments, the slide out information area provides the player a way to order different services. In some embodiments, the slide out information area provides an area for the player to play another game. It should therefore be appreciated that the slide out information area could be used to provide any suitable information to the player.

Gaming Device Platform

The features and advantages of the gaming system and method described herein may be provided to a player via a gaming device platform that includes various structures and components for allowing player interaction with the gaming device. While only one gaming device platform will be described in detail herein, the features, objects, and advantages of the gaming system described herein may be implemented in one or more alternative gaming device platforms.

Figure 1:
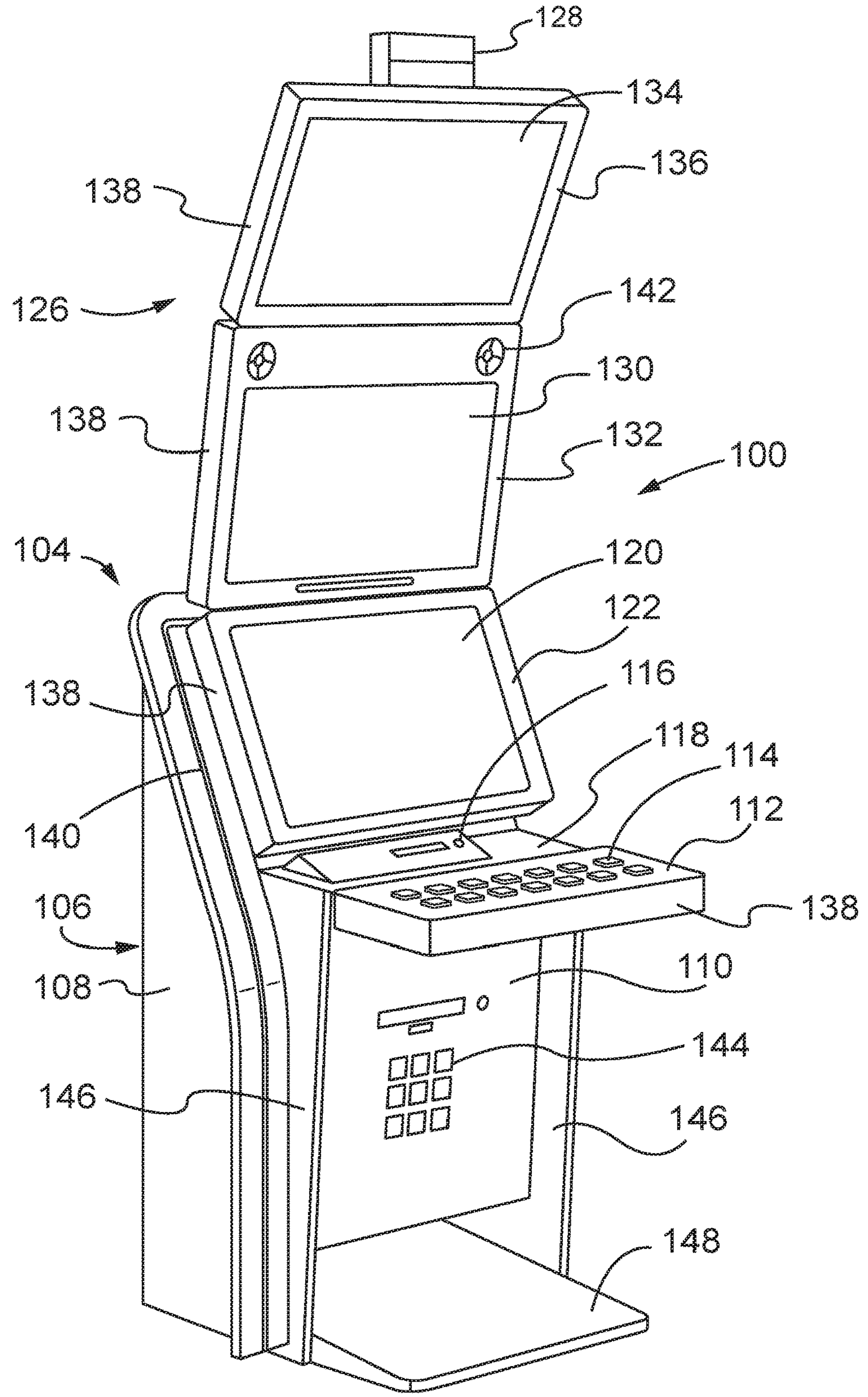
FIG. 1 is a perspective view of one embodiment of a stand-alone gaming device of a gaming system.

One embodiment of a gaming device platform is shown in FIG. 1 where a gaming device 100 is generally shown. In one embodiment, the gaming device 100 is referred to as a slot machine and is illustrated as housed in a housing or cabinet constructed so that a player can operate and play the gaming device 100 while standing or sitting.

Gaming device 100 may include cabinet 104 for housing the components fully described hereinbelow. The cabinet 104 has a lower cabinet body portion 106 which includes a pair of cabinet side panels 108 (only one of which is viewable in the perspective view of FIG. 1), front panel 110, and a rear panel (not shown). A base panel (not shown) and a top panel surface (not shown) that supports first game display 120 and the player interaction area 112, are provided. The cabinet panels are interconnected along their edges and cooperate to form a cabinet enclosure for housing the gaming device, as can be seen in FIG. 1.

It should be appreciated that a wide variety of cabinet enclosure sizes, shapes, and designs are possible for the gaming device 100. Cabinet 104 may function to securely protect any local control system, technology components, and provide support for game display(s) and player input and output interactions with the gaming device.

Returning to FIG. 1, the gaming device enables the player to interact with the gaming device 100 to direct the wagering and game play activities and preferences. Various forms of player interaction devices and activities will now be described.

Cabinet 104 includes a player interaction area having input and output areas generally designated as 112. The player interaction area 112 may be located on the front top side of cabinet 104 and, as shown, on a panel structure that extends outwardly from the gaming device in a player's direction. Player interaction area 112 may contain a plurality of player input and output structures such as player control button area 114, player value acceptor and dispenser area 116, and player convenience input area 118.

Player control button area 114 includes a plurality of buttons, touch sensitive areas, or both through with which players may interact with the one or more processors of gaming device 100 and direct game play. It is expected that cabinet 104 provides an easily accessible location and support for all necessary player input/output (I/O) interactions with the device, including gaming control interactions and value wagering interactions. Although the gaming device 100 illustrated in FIG. 1 shows player controls provided by buttons of player control button area 114, it is understood that in one embodiment a player's gaming control interactions could be made by either buttons mounted on cabinet 104 or "soft" buttons located on the gaming display and activated by player touch (e.g., touch screen interfaces), or a combination of both arrangements.

Player control button area 114 may include, for example: game selection button(s) in any embodiments where more than one game is provided in a single gaming device; gaming denomination value selection button(s) in any embodiments where one or more wagering denomination value is accommodated; wager selection button(s) for the player to indicate or select the desired wager value for a game in any embodiments where a selection of wager values are offered; pay line selection button(s) for selecting the number of active pay lines in game embodiments that provide multiple pay line wagering; a reel spin button for players to initiate one or more reels to spin in a game; a repeat last bet button for players to conveniently repeat the last game's preference and wager selections in a new game; a cash-out button for player extraction of gaming device credits; an attendant call button; and gaming device information buttons such as show pay tables, show game rules, or show other game-related information. As discussed above, the functions of the buttons in player control button area 114 may be duplicated with soft buttons in the player control button area 114 or as sort buttons in other areas of the gaming device 100 (e.g., as a touch screen overlay over available game displays).

Gaming device 100 may include one or more forms of value acceptance and value distribution to allow the player to interact with the device and to risk or otherwise place a wager (a monetary value) on one or mote outcomes of a game. Winnings may be returned to the player via some form of value distribution. As illustrated in FIG. 1, player value acceptor and dispenser area 116 is provided. In the player value acceptor and dispenser area 116, a player supplies monetary value to the gaming device 100 via one or more value acceptor devices. In one embodiment, the player value acceptor and dispenser area 116 (through the one or more value acceptor devices) may accept any one or more of the following from a player to establish a gaming credit balance: coins, bills, tokens, tickets/vouchers, player ID cards, credit cards, or other suitable forms of value. Thus, if the gaming device 100 accepts coins and bill, the gaming device 100 includes a currency bill validator and a coin validator as the value acceptor devices. Likewise, if the gaining device 100 accepts tickets, the gaming device includes a ticker acceptor as a value acceptor device for receiving tickets or vouchers representing some monetary value. The ticket acceptor may include a bar code reader, or other appropriate code reader, for reading the encoded value contained by the player's ticket or voucher. In some embodiments, the player value acceptor and dispenser area 116 may include a value acceptor device that can accept more than one type of value. In some embodiments, the player value acceptor and dispenser area 116 may include multiple different value acceptor devices to accept different types of value from players Upon receipt of some type of value from the player, a value acceptor device of the player value acceptor and dispenser area 116 performs validation on the player supplied value using appropriate hardware readers (e.g., determining that the currency bills/coins/tokens are genuine or the ticket/voucher is genuine). If the validation result is positive on player supplied value, the appropriate value acceptor device generates a signal to a processor of the gaming device 100 to establish a gaming credit balance for plays of one or more games on gaming device 100.

In one embodiment, a player receives monetary value, or a representation thereof, from the gaming device 100 when a player chooses to "cash out" the gaming credit balance (e.g., remove value from the gaming device 100). The player can cash out at any suitable time. When a player cashes out the value contained on a credit meter (not shown) of gaming device 100, a processor of gaming device 100 may cause a printer of gaming device 100 to print and dispense a coded ticket or voucher through a dispensing slot to the player. The coded ticket or voucher may be a bar-coded ticket or any other suitable code (PDF417 coding or quick response (QR) coding). This ticket can then be used as value input at another gaming device, or convened to currency at a conveniently located kiosk or cashier counter located near the gaining device. Alternatively, the processor of gaming device 100 may cause a currency bill dispenser or a coin dispenser in gaming device 100 to dispense the value contained on the credit meter of gaming device 100.

Various combinations of the above value acceptance and value distribution arrangements are possible. Gaming device 100 may include other value acceptance and value distribution mechanisms in the player value acceptor and dispenser area 116. For example, gaming device 100 may include a magnetic strip or chip card reader/writer in order to accept value from and transfer value to a magnetic strip or an embedded chip card. In other embodiments, hardware for transferring (and receiving) non-traditional currencies to players such as digital currencies (e.g., bitcoin) may be included in gaming device 100.

In an alternative embodiment, gaming device 100 may include a card reader (not illustrated) in the in the player value acceptor and dispenser area 116, which accept and reads any of a variety of magnetic strip or imbedded chip smart cards that convey machine readable information. The card reader reads inserted cards, in the case of wagering, for the credit information of the player for cashless gaming. The card reader may, for player loyalty programs, utilize the information on the card to identify the player account associated with the card so the gaming activity on the yarning device may be associated with the player account. It is noted that a numeric or alphanumeric keypad may be provided adjacent to the card reader slot to enable player entry of a personal identification number or the like for secure access to card information.

In one embodiment, a player convenience input area 118 may be included in the gaming device 100, as is shown in FIG. 1. In various embodiments, player convenience input area 118 may have a variety of features and functions depending on the jurisdictional deployment of the gaming device 100. In one embodiment, the player convenience input area 118 will house a magnetic strip card reader (not illustrated), integrated circuit chip card reader (not illustrated), or both, for reading cards associated with a player loyalty program. Player loyalty programs, also referred to as player tracking systems, provide magnetic strip or chip cards to players for insertion into a gaming device during play. These player loyalty/player tracking cards are associated with a player account and are utilized by the card-issuing entity to monitor, or track a player's gaming activity and build loyalty through player rewards of a variety of types. The player convenience input area 118 may include an input mechanism such as input buttons so that a player may input a personal identification number or other require player information associated with the player tracking card. Further, the input mechanism may also include a small display utilized to communicate player information to the player such as the player's current loyalty rewards.

In certain embodiments, the player convenience input area 118 may include player convenience features such as a pocket for storage that allows players to store their personal items such as a mobile phone. Gaming device 100 may include one or more universal serial bus (USB) ports that enables a player to charge their electronics or connect to services such as the Internet or food service. Further, player convenience input area 118 of gaming device 100 may include buttons to request food or drink service if the gaming device is located in an establishment that has food and drink service. The gaming device 100 may be connected to a local or wide area network such that selection of the requested food or drink service will alert the establishment's hospitality staff to deliver the requested service directly to the gaming device 100.

The layout of the player control button area 114, player value acceptor and dispenser area 116 and the player convenience input area 118 in gaming device 100 may be arranged differently than those disclosed and illustrated herein. The selections and arrangement of input locations on the cabinet 104 may be dependent upon the game buttons, the type of value wagered, and the player conveniences utilized in the deployment configuration of gaming device 100.

With continuing reference to FIG. 1, in one embodiment, lower cabinet body portion 106 includes a first game display 120 mounted atop or flush with the lower cabinet body portion's top panel surface. First game display 120 is, for example, a 27-inch liquid crystal display (LCD) display mounted in a widescreen orientation. However, any suitable display may be used in any suitable orientation. In the illustrated embodiment, the first game display 120 is mounted within and framed by first display frame 122 which is, in turn, mounted upon lower cabinet body portion's top panel surface. In this manner, the first game display 120 is both surrounded and secured within the first display frame 122 and raised above the cabinet's top panel surface. Additional features of the first display frame 122 will be described below. In one embodiment, gaming device 100 may use one first game display 120 and not include additional game displays (not illustrated).

The lower cabinet body portion 106 is further constructed to support upper cabinet portion 126. Upper cabinet portion 126 may be comprised of an upwardly extending support structure (not illustrated) that extends upwardly from the rear side of lower cabinet body portion 106 and is sufficiently strong to support one or more additional game displays.

At the topmost end of the support structure, a cabinet top light 128 may be provided. The cabinet top light 128 is capable of illumination in a variety of colors and is utilized to indicate and communicate gaming device conditions to gaming players and service personnel.

Further, the upper cabinet portion support structure may conceal power and communication lines between (1) the control systems and components located within the lower cabinet body portion 106 and (2) the displays mounted on the upper cabinet portion 126 support structure.

In one embodiment, as illustrated in FIG. 1, gaming device 100 includes two additional displays, second game display 130 and third game display 134. Second game display 130 and third game display 134 are disposed generally in a vertical relationship and generally in alignment with the first game display 120. Like the first game display 120, second game display 130 and third game display 134 can be 27-inch LCD displays and can be mounted in a widescreen orientation in one embodiment. However, any suitable display in any suitable orientation may be used for the second game display 130 and the third game display 134. Further, like the first game display 120, second game display 130 and third game display 134 can be mounted within and framed by second display frame 132 and third display frame 136, respectively. Second display frame 132 and third display frame 136 are attached to the upper cabinet support structure and can protect the second game display 130 and the third game display 134.

First game display 120, second game display 130, and third game display 134 can be disposed at an angle from each other to form a player-facing concave arc. However, in some embodiments, the angles between the displays may be adjustable and may be smaller or greater than the angles illustrated in FIG. 1. Further, it is understood that in some embodiments the displays may be disposed in a common plane relative to each other.

It also should be appreciated that in various embodiments a variety of display technology may be utilized equivalency and interchangeably with a variety of embodiments of the gaming device. Equivalent display devices include all variations of liquid crystal displays, light emitting diode displays, and plasma displays.

In some embodiments, different sized displays may be combined to display gaming data on gaming device 100. As a non-limiting example, a 27-inch widesereen LCD display may be combined with a 20-inch portrait oriented LCD or a light emitting diode (LED) display. This combination may be used, for example, with a third scrolling banner LED display. In alternative embodiments, one, two, three, or more displays could be used in a variety of positions and orientations. Any suitable combination may be used. It should also be appreciated that a processor of gaming device 100 may communicate with the disclosed first game display 120, second game display 130, and third game display 134 through a video card of gaming device 100 to produce the visible aspects of a game.

In one embodiment, one or more of the first game display 120, second game display 130, and third game display 134 may be fitted with a transparent touch sensitive overlay for sensing player touch inputs into the gaming device. Touch sensitive overlays can communicate with a processor of gaming device 100 to enable the player to interact with the game.

In some embodiments, the curved displays may be used for any or all of the first game display 120, second game display 130, or third game display 134. Similarly, any of the displays used for gaming device 100 can be based on flexible display technologies. For example, it is possible to utilize flexible display technologies to create uniquely shaped curving, wavy, or tubular display structures to provide one or more of the first game display 120, second game display 130, and third game display 134. Additionally, in one embodiment flexible display technologies can be used in combination with fixed flat screen technologies.

While the gaming device 100 has been described as implemented with video technologies, in one embodiment, mechanical reels with reel strips containing game indicia and step motor controller's may be employed to provide game information to a player. In one embodiment, the reel strips may include a plurality of printed symbols. In another embodiment, the mechanical reels may include flexible video display technology as the reel strips on mechanical reels. Thus, games implemented in video form can readily be implemented with mechanical reels utilizing such display technology. Alternatively, in other embodiments mechanical reels with reels strips having fixed symbols displayed along the reel strip could be used to implement the game.

Dependent upon the particular gaming device housing style, a variety of other display technologies may be utilized in combination with the gaming device disclosed herein. For example, in some embodiments a gaming device may have one or more display devices in addition to the main game display(s). For example, the gaming device may include a player tracking device having a player tracking display which displays various information to the player regarding the player's status. The gaming device may also include other game-related displays such as the wager display and the gaming credit balance display. These additional game-related displays may be separate display devices or may be displayed on any one or more of the first game display 120, the second game display 130, or the third game display 134.

Cabinet lighting design functions to attract players to a gaming device 100. In the embodiment of FIG. 1, attractive cabinet lighting is provided by frame accent lighting 138. It is noted that frame accent lighting 138 is a common structure found on each of the first display frame 122, the second display frame 132, and the third display frame 136 and player interaction area 112. Example areas where frame accent lighting is applied to gaming device 100 are commonly designated as frame accent lighting 138.

Frame accent lighting 138 may have multiple components. The side edge pieces of first display frame 122, second display frame 132, third display frame 136, and the edge structure of player interaction area 112 can be made of a translucent of transparent plastic or other suitable materials. Linear arrays, or strips, of light emitting diodes (LEDs) (not shown) on circuit boards may be mounted below the translucent or transparent plastic side edge pieces 138. In one embodiment, the circuit boards are flexible circuit boards. These LED strips and transparent or translucent coverings may surround one or more gaming device displays frames, as well as the player interaction area, to highlight these areas.

In one embodiment, the individual LEDs mounted on the LED strips are of a type that can emit red, green, and blue light. In an alternative embodiment, separate LEDs are used for each required light color. All LED strips can be electrically connected and can be controlled by a cabinet lighting controller 218 (illustrated in FIG. 2) in conjunction with a processor of gaming device 100 to selectively mix the emitted light colors in a manner to create any color. The cabinet lighting controller 218 can flash and vary lighting as desired. For example, cabinet edge lighting can change and flash in combination with music rhythms or in combination with game events. Other variations are possible.

In some embodiments, cabinet 104 may include LED strip lighting or LED rope lighting to accentuate the cabinet and enhance the attractiveness of gaming device 100 to players. LED rope lighting is a plurality of small light-emitting diode bulbs linked together and encased in a plastic, polyvinylchloride, or other suitable material to create a string of lights. For example, in the embodiment of FIG. 1, cabinet 104 includes cabinet accent lighting 140. In one embodiment, cabinet accent lighting 140 is LED rope lighting mounted flush with the front side edge of the cabinet side panels 108. The LED rope lighting can generate any of suitable colors, and are controlled by cabinet lighting controller 218 and a processor of gaming device 100 to selectively mix the emitted light colors in a manner to create any color in the same manner as the frame edge lighting.

In various embodiments, gaming device 100 includes one or more audio speakers and appropriate driving electronics and sound cards so that game players may experience pleasing audio aspects of the gaming device 100. Audio is desirable to attract and maintain player interest in gaming device 100. Gaming device 100 may also emit attraction sounds during any idle period of gaming device 100. Game audio may add to the player's enjoyment of gaming device 100 by providing music and sound effects designed to enhance and compliment the gaming experience.

Audio speaker hardware may include one or more speakers disposed in or on the cabinet 104 of gaming device 100. In FIG. 1, a pair of audio speakers 142 are shown mounted on the upper corners of second display frame 132. Any suitable number of additional speakers may be provided on additional display frames or on the lower cabinet body portion 106 as desired.

Speakers designed for emitting bass vibrations may be included in some embodiments. Speaker placement may be selected to enhance the sound emitting characteristics of the gaming device. For example, bass speakers or additional speakers 144 may be mounted inside lower cabinet body portion 106. Further, it is envisioned that in some embodiments sound processing such as multichannel processing and surround sound processing are included in gaming device 100. Audio jacks for attachment of player headphones may also be provided in some embodiments of gaming device 100 for the player to further enhance the audio experience of the game and also to block out noise from other gaming devices.

In one embodiment, front panel 110 of lower cabinet body portion 106 includes a locked removable panel or locked door (not shown), which can be opened for access to internal control system and technology components that are housed within lower cabinet body portion 106 (discussed hereinbelow with respect to FIG. 2). Front panel 110 may be flanked on vertical sides by cabinet side panel extensions 146 which serve to define a space below player interaction area 112 for players to place their feet and legs while they are playing gaming device 100 in a seated position. Foot rest 148, which may be cushioned, is provided below player interaction area 112 to enhance a player's ergonomic comfort while playing gaming device 100. In one embodiment the edges of player interaction area 112 maybe economically cushioned as well.

Gaming device 100 may be embodied in alternative gaming device housing forms and styles. For example, the housing may have fewer or greater number of display areas for displaying the game and game-related information to the player. If multiple displays are used, the displays may be of similar size, shape, and orientation or the displays may be divergent from each other in one or more of their respective descriptive characteristics. The one or more displays can be supported by, mounted upon, or housed within a cabinet 104 which can comprise a variety of shapes, sizes, and forms. The cabinet 104 can 1) protect and house the operational electronics, 2) adequately support the display(s) in a position easily viewable for a seated or standing player, as necessary 3) provide an easy location and support for all necessary player input/output (I/O) interactions, including gaming control interactions and value wagering interactions. For example, in some embodiments the gaming device 100 may be disposed in a housing style referred to as a "slant top" gaming device that is designed to be operated with the player comfortably seated. In this arrangement, generally, the gaming display(s) and all player I/O controls are located on a low, wide, surface that extends forwardly from the player on a horizontal plane and then slopes upwardly and away from the player's seated location.

In one embodiment, housing styles of cabinet 104 of gaming device 100 may include bar top or table top housing arrangements. These housings are generally small enough to be placed on top of an existing bar or table while providing the requisite gaming device housing functions of protection of/access to gaming electronics, displays, and player I/O functions described above.

In one embodiment, cabinet 104 may be an embedded housing. Embedded housings are built into structures designed to otherwise function as bars or tables in a gaming environment. Displays may be integral with the bar top or table top surface or the entire unit may be contained below a transparent bar or table top surface while controls are disposed on the lower front or side of the bar or table.

Figure 2:
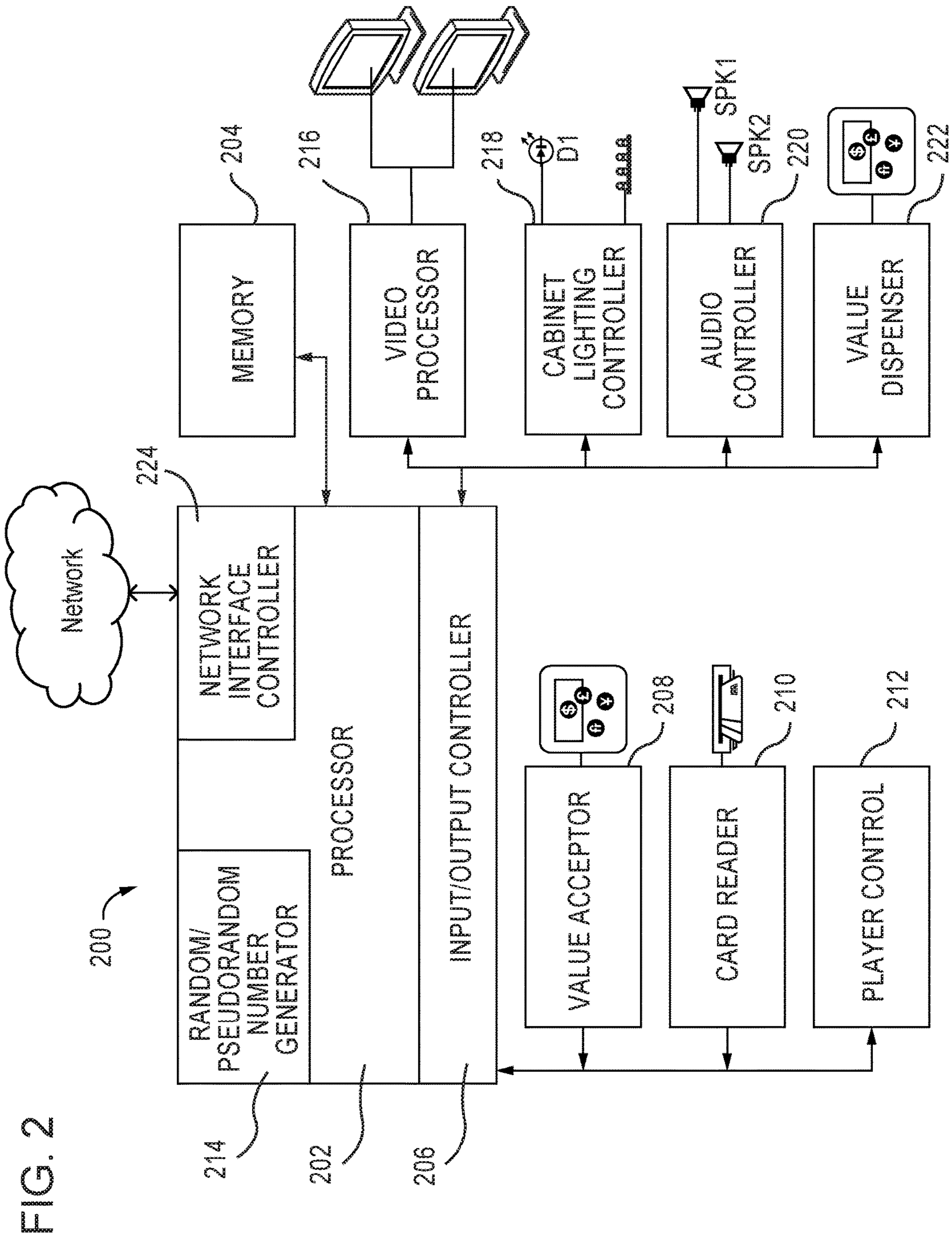
FIG. 2 is a functional block diagram of the gaming device technology components of the gaming system.

Turning now to FIG. 2, the features and advantages of she gaming system described above will now be described in terms of the various technology components for allowing player interaction with the gaming device 100.

FIG. 2 illustrates a functional block diagram of an embodiment of technology components of gaming device 100 that are specially configured to carry out the game function and operations described herein. The functional elements shown in FIG. 2 cooperate, on a broad and general level, to function as gaming device 100. The subject matter and functional operations described in relation to FIG. 2 can be embodied in hardware, software, or a combination thereof. Described hardware includes the structures described and their functional or operational equivalents. Described functions may be performed by hardware, digital circuitry, computer software, computer firmware, or functionally equivalent combinations thereof.

In one embodiment, gaming device 100 is functionally controlled by control unit 200. Control unit 200 is specifically configured and functions to perform all aspects of operations for providing the game. Control unit 200 includes at least one specially configured processor and at least one controller configured to operate with at least one memory device and at least one data storage device, at least one input device, and at least one output device. In one embodiment, control unit is also configured to communicate with a server device through a network.

In one embodiment, control unit 200 includes at least one specially configured processor 202 or central processing unit (CPU). In one embodiment, specially configured processor 202 include arithmetic logic units and math co-processors also known as floating point units. In one embodiment, specially configured processor 202 includes registers for holding instructions or other data, and cache memory for storing data for faster operation thereupon. In one embodiment, specially configured processor 202 may be a multicore processor that includes two or more processors for enhanced performance, more efficient parallel processing, or other advantageous computing functions. In another embodiment, specially configured processor 202 maybe one or more processing devices such as microprocessor(s) or integrated circuit(s) and may include one or more controllers. It should be appreciated that in some embodiments, a general purpose processor could be programmed to perform the functions of specially configured processor 202.

A controller, in one embodiment, is a device or a software program that manages or directs the flow of data between two entities. Often, controllers are special purpose circuitry or software that solve a technical communications problem between different technology systems. In one embodiment, a controller functions as an interface between two systems while managing the communications between the systems. In another embodiment, a controller functions as an interface between a processor and a peripheral device and functions to control the peripheral device.

At least one specially configured processor 202 or controller of control unit 200 is specially configured to communicate with at least one memory device, generally shown as memory device 204 in FIG. 2. In one embodiment, memory device 204 includes one or more memory structures for storing instructions and various types of game data. Memory structures include one or more random access memory units (RAMs) units, one or more read only memory units (ROMs), one or more flash memory units including solid stale drives (SSDs), one or more electrically erasable/programmable read only memory units (EEPROMs).

It should be appreciated that in one embodiment, communication with a memory device by a processor or a controller encompasses the processor or controller accessing the memory device, exchanging data with the memory device, or storing data to the memory device.

Memory device 204 may store all program code and game code (collectively the "code"), and operation data necessary for the operation of the gaming device 100 and execution of the gaming features described hereinbelow. In an alternative embodiment, game code and operation data necessary for the operation of the gaming device 100 may be store in a distributed manner such that some code is stored in memory device 204 and other code is stored remotely from gaming device 100. In one embodiment, the code and operation data necessary for the operation of the gaming device includes, for example, basic input and output function data, instruction fetching data, bus and network communication protocol data, and like data necessary for an operational gaming device 100. In one embodiment, the code and operation data necessary for the execution of the gaming features includes, for example, game image data, game rule data, pay table data, game mode and timing data, gaming value and wager parameter data, and random or pseudo-random number generation data.

In addition to the memory device 204 described above, in one embodiment, the code and operation data for the operation of the gaming device described above may be stored in removable game cartridges or flash drives, a compact disk ROM, a digital versatile disk (DVD) optical storage technology, or suitable other fixed non-transitory storage mediums. In another embodiment, part or all of the code and operational data tor operation of the gaming device or for execution of the game features may be stored in a remote memory structure and be downloaded to the memory device 204 via a network connection.

In one embodiment, the gaming device 100 may utilize any combination of memory devices such as random access memory devices (RAMs), unalterable memory devices (ROMs), and mass storage devices for securely storing and securely communicating the software components or code that facilitate game play and other functions of the gaming device 100. The memory devices may store software components or code that include various game data and game related control and execution software. In some embodiments, the software components stored in the memory devices may include gaming system initialization software, system basic input and output software, operating system software, value acceptor software, value dispenser software, display image generation software, game symbol set image generation software, game rule execution software, game data set(s), random number generation software, system driver software, system data bus management software, audio generation and speaker driver software, and video generation and display driver software, and any other suitable software routines for operation of the gaming device 100.

In some embodiments, the memory devices, such as memory device 204, with the software components and other data may be secured and authenticated by authentication software stored in an unalterable memory device within the housing of gaming device 100. The gaming device 100 may also include application specific integrated circuits (ASICs) to perform the security and authentication functions. At any appropriate time, such as before each play of a game, at a predetermined interval, upon transfer of any game data or any software components from a mass storage to memory device 204, or upon demand, the gaming device 100 (using a processor such as processor 202 or a separate ASIC) may execute an authentication routine and perform an authentication of any software component or other data of the gaming device 100. In one embodiment, the gaming device software components may be prepared for authentication via creation and storage of an encrypted signature unique to one or more of the software components.

In one embodiment, an encrypted signature may be created by utilizing a hash function on a software component or code to form a message digest (i.e., a basis of the software component) followed by a key encryption of the message digest to form an encrypted signature unique to the software component. In some embodiments, the key encryption may be public key encryption, private key encryption, or any suitable key encryption schema. The encrypted signature may be stored with the gaming device software component, for example, in a mass storage device or an unalterable memory. During a software component authentication, the gaming device 100 executes one or more authentication routines utilizing the same hash function to operate on the software component to compute, or re-create, a new message digest for the software component. The new or re-created message digest may then be compared with a previously created message digest obtained by decrypting the stored encrypted signature. Matching message digests between the new and previously created message digests indicate that the software component is authentic and gaming device 100 may allow game play to proceed. However, when the message digests do not match, the gaming device 100 may determine that the software component under authentication may be corrupted or fraudulent and game play may be halted. It should be appreciated that the gaming device 100 may perform other suitable security and authentication checks on the game data or software components. Such authentication and security devices and functions are unique to gaming and casino industry to minimize or prevent fraud in gaming devices and gaming systems.

For a player to interact with gaming device 100, control unit 200 receives and processes player inputs, and control unit 200 causes processed results to be output or communicated to the player. In one embodiment, player inputs are recognized and processed or directed for processing by input/output (I/O) controller 206. Further, I/O controller 206 may process and direct player outputs for communication to the player. I/O controller 206 can function as the intermediary between the specially configured processor 202 and one or more input devices to control information and data flow therebetween. I/O controller 206 may also function as the intermediary between the specially configured processor 202 and one or more output devices to control information and data flow therebetween. I/O controller 206 is configured to understand the communication and operational details (such as hardware addresses) for each attached input device and output device. In this manner, specially configured processor 202 is freed from the operational details of the peripheral I/O devices. For example, in one embodiment where an input or output device is changed or upgraded, I/O controller 206 can be changed without changing other gaming system 100 components.

In one embodiment, a player deposits value into gaming device 100 by inserting some form of currency into a value acceptor 208 for game play. Alternatively, a player deposits value into gaming device 100 by inserting an encoded paper ticket into a value acceptor 208 for game play in one embodiment. Value acceptor 208 can be combined with a currency reader and validator, and a code reader for reading value encoded on paper tickets. Value acceptor 208 may read, validate and communicate the amount of the inserted value to the specially configured processor 202. Specialty configured processor 202 can establish a gaming credit balance for the player based on the communication from the value acceptor 208. Specially configured processor 202 can also communicate the player's credit balance on a credit balance display of gaming device 100. During game play, each time a player risks a wager on an outcome, specially configured processor 202 processes the wage and determines the amount of credits to debit from the player's credit balance. When a winning outcome is obtained, specially configured processor 202 is configured to determine the amount of credits to add to the player's credit balance.

As previously mentioned with respect to FIG. 1, a variety of value acceptance arrangements are possible. In one embodiment, the value acceptor 208 could include magnetic strip or chip card readers to accept and transfer value. Value acceptor 208 may also be configured to accept and transfer non-traditional currencies such as digital currencies. In these embodiments, I/O controller 206, a specially configured processor 202, or both contain appropriate control instructions to communicate and extract value from the inserted item containing value. In one embodiment, use of a magnetic strip or embedded chip card, for example a bank card, for value insertion requires specially configured processor 202 to communicate, via network interface controller 224 (described below), with devices external to the gaming device 100.

In one embodiment, card reader 210 may be included in gaming device 100 to accept player loyalty cards. For example, card reader 210 can extract account identifying information from the card and utilizes this information to access the associated account information stored remotely via network interface controller 224. In embodiments where player loyalty/player tracking systems are employed, a player's loyalty account and record of gaming activity can be stored in a networked storage location or database. Specially configured processor 202 is configured to record the player's gaming activity in memory device 204 during the duration of loyalty card insertion. When the loyalty card is removed from card reader 210, recorded gaming activity is uploaded, via network interface controller 224, to the remote storage location associated with the player's account. In this manner, the player's gaming activity can be further processed and analyzed, and the player can be awarded loyalty rewards based upon his activity data.

In various embodiments, player control 212 receives a player's game inputs and communicates the player's game inputs to specially configured processor 202. The player's game inputs may include, but are not limited to, wager amounts, pay line selections, game control signals, and cash-out signals. The player control 212 may generate signals based on button presses, touch screen activations, or voice control. The player initiated signals are propagated to the specially configured processor 202 by I/O controller 206. Further, the player initiated signals may direct and inform execution of the game instructions stored in memory device 204 and configured to be executed by specially configured processor 202.

In one embodiment, specially configured processor 202 is configured to execute stored program code and instructions which generate random numbers or pseudo-random numbers. In one embodiment, as illustrated in FIG. 2, a random number generator (RNG) 214 is a software module configured to be executed by specially configured processor 202 for the generation of a true random or pseudo-random number. The code for RNG 214 may be stored in memory device 204. RNG 214 generates random numbers for use by the gaming software during game execution. In one embodiment, random numbers are utilized by game software for the random selection of one or more game symbols from a set of game symbols during a game. In some embodiments, the random selection of one or more game symbols is represented by spinning reels in a virtual video reel slot machine game (however any suitable game can be used). As a non-limiting example, the set of game symbols can include numbers, letters, geometric figures, symbols, images, character, animations, blank symbols (e.g., the absence of symbols), or any other suitable graphical depiction. In various embodiments, once random symbols are selected based upon the random number generated by RNG 214, patterns of symbols are compared to determine wagering outcomes. In an alternative embodiment, gaming device 100 may include a hardware based random number generator that is in communication with specially configured processor 202 to supply random numbers for game generation purposes. The hardware based random number generator may be incorporated into specially configured processor 202 or can be separate from specially configured processor 202.

In yet another embodiment, random generation of "numbers" or symbols may be performed with electro-mechanical components. For example, gaming devices such as gaming device 100 may incorporate a plurality of mechanical reels rotatable about a common axis. A plurality of indicia or symbols may be positioned around the periphery of the plurality of reels. Each of the indicia or symbols on each reel may indicate separate detectable reel stop positions. The reels can be set into a spinning/rotation motion by pulling a lever or pushing a button. In some embodiments, the gaming device 100 can stop the reels by the gaming device 100 actuating, on a random timing basis, a suitable mechanical or electro-mechanical reel brake. When the reels stop rotating, one or more displayed stop positions of each reel is detected. Since the stop positions are each associated with an indicia or symbol, the gamin u device can determine whether the combination of stop positions (i.e., translating to a combination of displayed symbols) results in a winning symbol combination.

Returning to FIG. 2, control unit 200 controls the function and output of a plurality of output devices utilized by gaming device 100. In various embodiments, I/O controller 206 serves as an interface unit between specially configured processor 202 and output devices such as video processor 216, cabinet lighting controller 218, audio controller 220, and value dispenser 222.

In one embodiment, video processor 216 communicates with specially configured processor 202 to render all game graphics, video displays, and information on gaming device 100's one or more video display units. In one embodiment, video processor 216 includes one or more processors, controllers, and/or graphics cards for processing she game images, outcomes, and animated displays and coordinating the processed data to be display between, among, or across any or all display devices. In various embodiments, this may include being configured to simulate objects and the movement of objects which represent video reels containing sets of gaming symbols.

It should be appreciated that in certain other embodiments where physical mechanical reels are utilized by the gaming device 100 as a game displays, reel controllers and stepper motors would be provided in lieu of or in addition to video processor 216.

In embodiments which utilize cabinet lighting as described with respect to FIG. 1, a cabinet lighting controller 218 may be utilized to coordinate and control the color and timing of cabinet lighting displays with specially configured processor 202. In certain embodiments which utilize sound design, specially configured processor 202 may utilize audio controller 220 to coordinate and control the sound emissions. In one embodiment, audio controller 220 may include one or more audio processing cards for generating sound and for driving the one, two or more speakers that may be included with gaming device 100.

In various embodiments, players may collect remaining credit value by initiating a signal via player control 212 which is communicated to specially configured processor 202 via I/O controller 206. The signal triggers a readout of the player's credit amount and specially configured processor 202 initiates a value dispensing signal which, in turn, is communicated to value dispenser 222. In one embodiment, value dispenser 222 can be controlled to issue the player's credit value using any of the types of value discussed herein. In some embodiments, the player's credit value may be issued to the player via a printed and dispensed encoded paper ticket or token which the player can then exchange at a special purpose kiosk or cashier location for the monetary value encoded into the ticket or token. In some embodiments, the specially configured processor 202 can direct the value dispenser 222 to issue to the player an appropriate amount of coin or bills directly to the player. Additionally, or alternatively, in some embodiments, the player may have the option to electronically direct the credit value to an account associated with the player.

In some embodiments, control unit 200 of gaming device 100 may communicate with one or more devices outside the gaming device 100. For example, gaming device 100 may be connected to a larger gaming network via a local area network (LAN) or a wide area network (WAN). Control unit 200 may communicate with one or more central servers, controllers, or remote devices to execute games, establish credit balances, participate in jackpots, etc. In such embodiments, network communications and connections are accomplished via a network interface controller 224. Network interface controller 224 can be a digital circuit board or card installed in control unit 200 to provide network communications with external devices.

In some embodiments, various additional features and functions are performed by control unit 200. For example, control unit 200 maybe specially configured with appropriate software to track all game play events that occur on gaming device 100. In some embodiments, control unit 200 may audit all recorded monetary transactions, including all wager amounts, game outcomes, game winnings, and game payouts that occur through gaming device 100. Further, some embodiments may include security software to assist in protecting the gaming device 100 from tamper or alteration attempts.

Gaming System and Method Including a Slide Out Information Area and Game

Figure 3A:
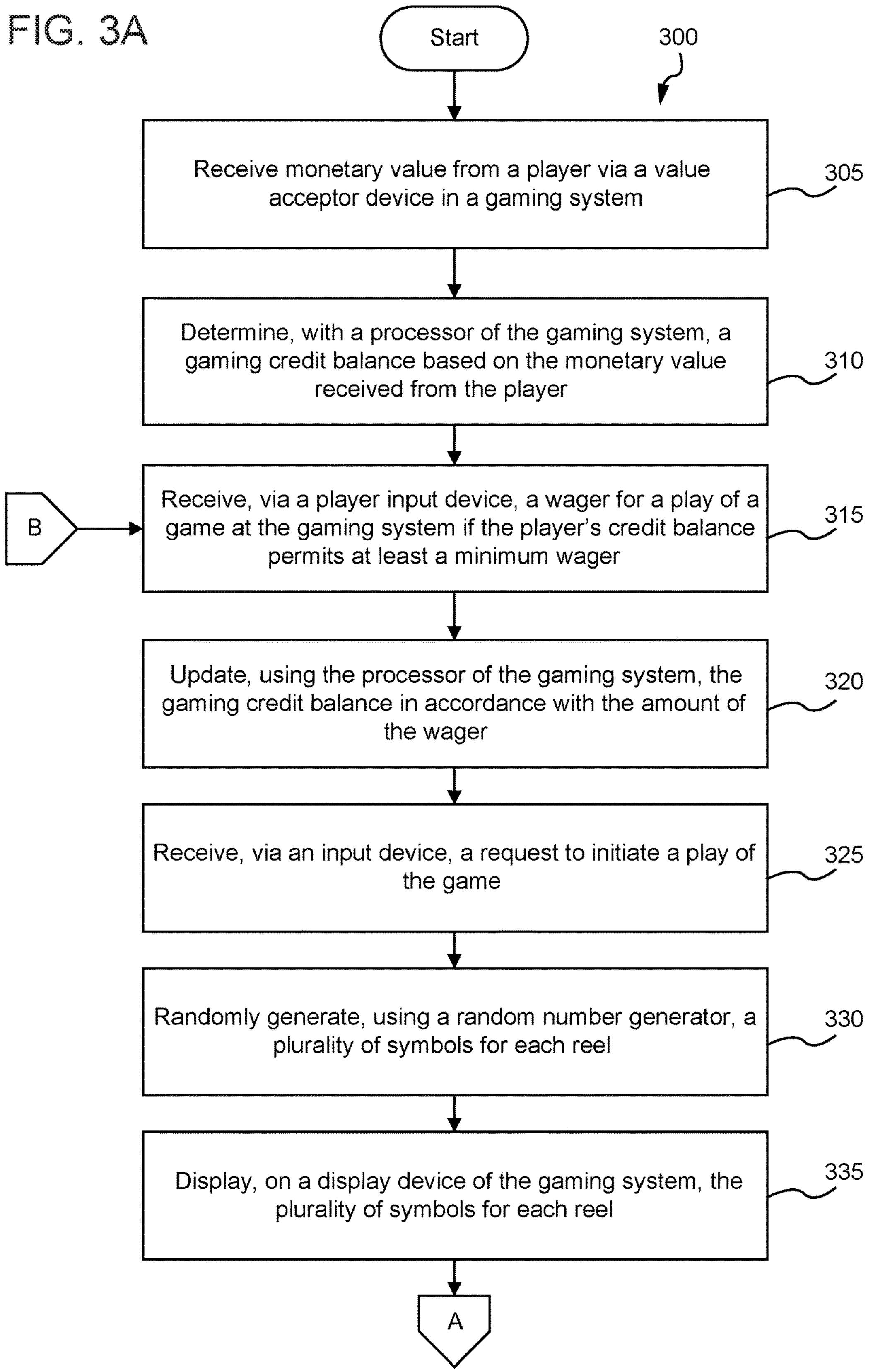
FIGS. 3A, 3B, and 3C illustrate one embodiment of a method of operating the gaming system with a slide out information area.
Figure 3B:
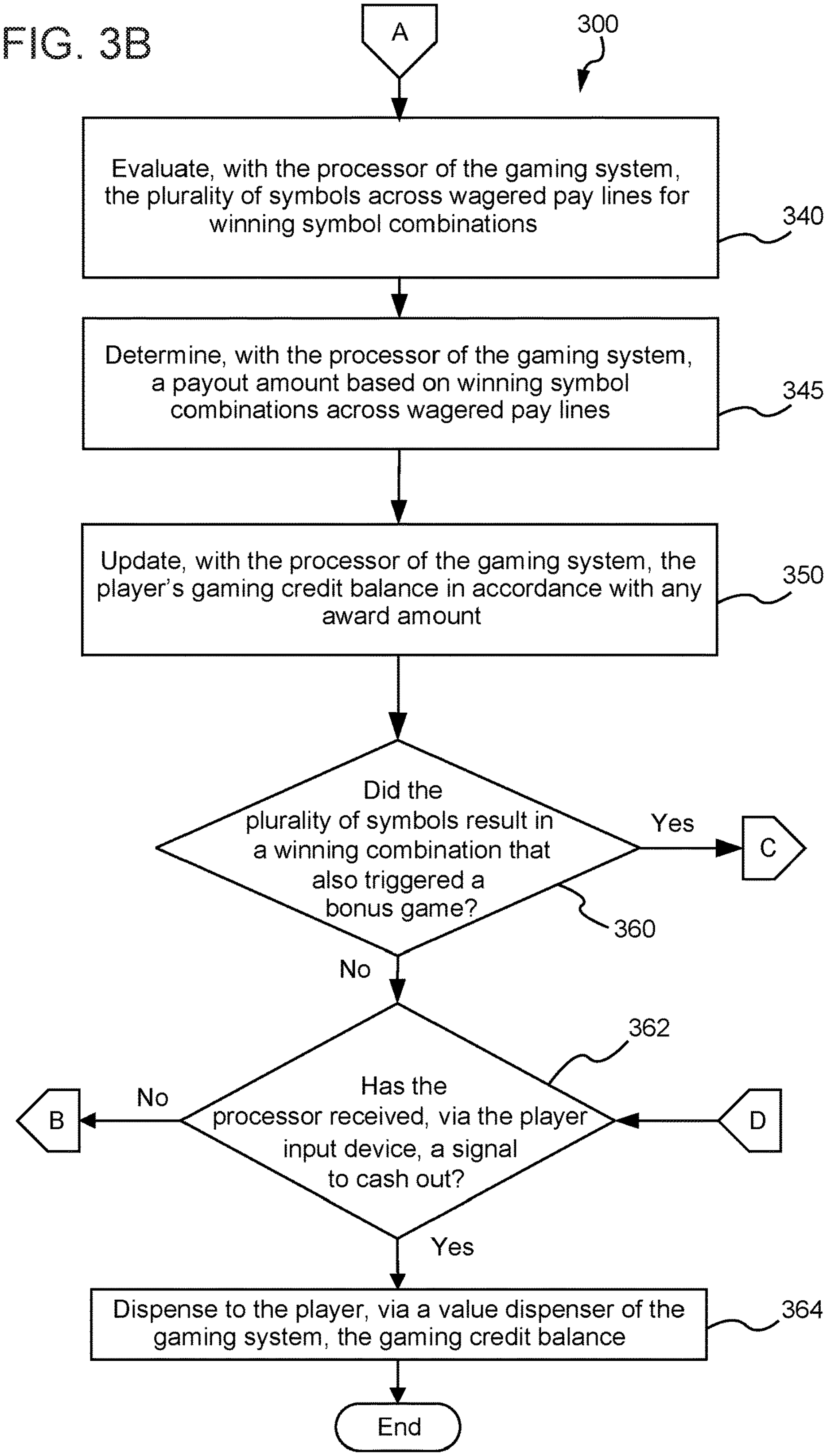
Figure 3C:
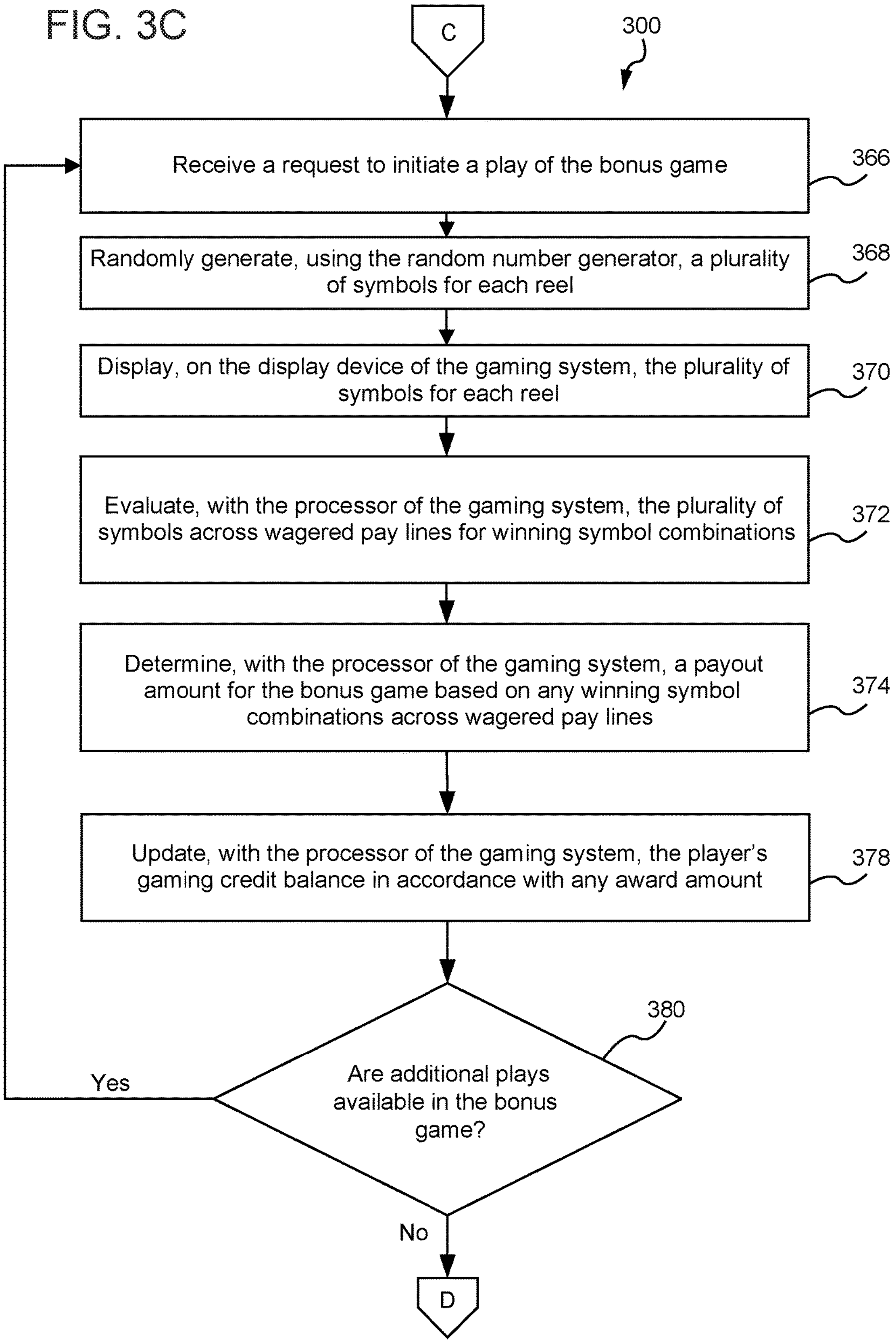
Figure 4:
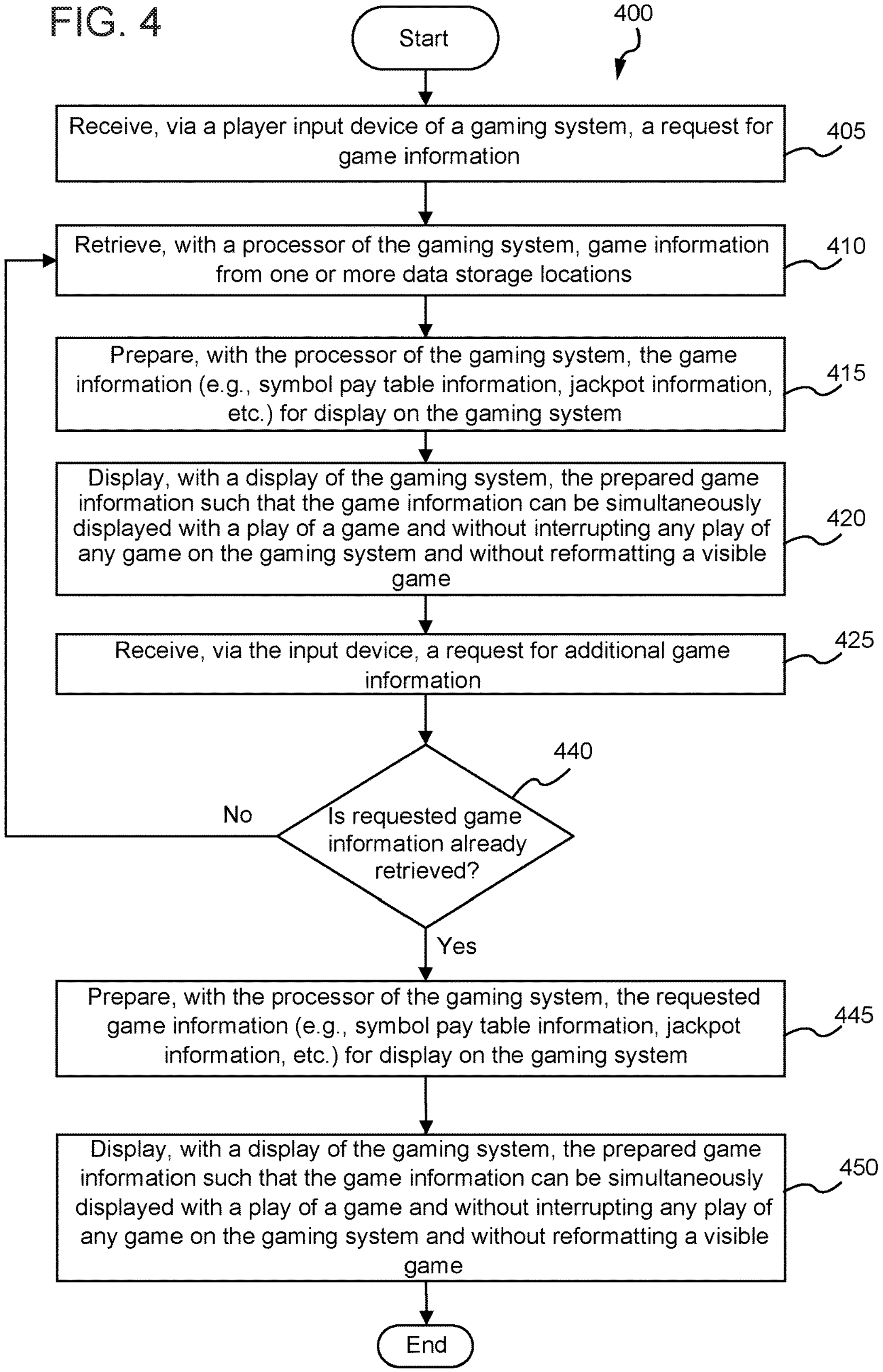
FIG. 4 illustrates one embodiment of a method of operating the slide out information area of the gaming system.

FIGS. 3A, 3B, and 3C illustrate a flowchart of an example operation 300 of one embodiment of the gaming system and method. While not shown in FIGS. 3A-3C, the flowchart of an example operation 400 illustrated in FIG. 4 may be executed at any point in time during the example operation illustrated in 300. The operation in FIG. 4 is described in more details below. In one embodiment, a processor is configured, via instructions stored in a memory device, to perform the operation 300. However, it should be appreciated that other suitable variations of operation 300 are possible. For example, in one embodiment, fewer or one or more additional blocks (not shown) may be employed in operation 300 of the gaming system and method. In other embodiments, the blocks may be performed in any suitable order.

FIG. 3A illustrates one embodiment in which the gaming system receives a monetary value from a player to initiate operation 300. As indicated in block 305, the gaming system may receive monetary value via a value acceptor device associated with the gaming system. The value acceptor device, in one embodiment, is disposed in a gaming system or in communication with the gaming system as discussed above.

In one embodiment, the gaming system determines a credit balance based on the monetary value received from the player at a value acceptor device as indicated in block 310. The gaming system determines, via a processor, a gaming credit balance for the player. The gaming credit balance may be based on the monetary value received from the player at the value acceptor device.

In one embodiment, the gaming system may receive a wager for a play of a game at the gaming system. Block 315 of FIG. 3A illustrates one embodiment where the player's wager is received via a player input device. The gaming system may allow a player to place a minimum wager, a maximum wager, or any suitable wager amount. Depending on the wager amount, the gaming system may also enable the player to select pay lines across displayed symbol positions on reels in a game in which to place wagers. Although in some embodiments, the gaming system selects the wagered pay lines based on the player's wager. In one embodiment, the gaming system may determine whether the player provided enough credits to enable the player's selected wager. The gaming system may prevent the player from placing the wager and starting a play of a game if the player's credit balance is not large enough to support the player's selected wager. If enough credits are not available in the player's credit balance, the gaming system enables the player to insert additional value to obtain the minimum credit level or to cash out of the gaming system.

In one embodiment, the gaming system may use a processor of the gaming system to update a gaming credit balance. The credit balance may be updated in accordance with the player's wager amount as indicated in block 320. Some embodiments, the credit balance is not updated until a later time.

Block 325 illustrates one embodiment in which the gaming system may receive a request to initiate a play of a game. The request to initiate the play of the game may be received from a player via a player input device in communication with the gaming system. The gaming system may securely access game data from a memory device and execute an authentication routine on the game data to start a play of a game. For example, the player may press a spin button on the gaming system to start the spinning reels (or randomly generating symbols using other methods discussed above for virtual reels) for the play of the game. It should be appreciated that reels used throughout the specification may refer to mechanical reels, electro-mechanical reels, or virtual video reels (where virtual reels strips or no reel strips are used).

In one embodiment, the gaming system may use a random number generator to randomly generate a plurality of symbols from a set of symbols as indicated in block 330. In one embodiment, at least some of the symbols in the set of symbols are classified or associated with a symbol type. In some embodiments, the gaming system may generate the plurality of symbols for display on a set of reefs (or virtual reels). As used herein, the random number generation may refer to pseudo-random or true-random number generation depending on the module used for the random number generation.

In one embodiment, the gaming system may cause a display device to display the plurality of symbols generated as indicated in block 335. in a game using reels (or virtual reels), the gaming system may display the generated plurality of symbols in visible symbol display areas of each of the reels. Off page connector A refers to FIG. 3B to continue operation 300.

Turning now to FIG. 3B and off page connector A, in one embodiment as shown in block 340, the gaming system evaluates the generated plurality of symbols across wagered pay lines for winning symbol combinations. In some embodiments, the gaming system evaluates the winning symbol combinations based on the pay lines wagered upon by a player. The gaming system may evaluate the player selected pay lines, gaming system assigned pay lines, or wagered pay lines assigned in some other manner for the play of the game. In one embodiment using reels (or virtual reels), the gaming system determines an award amount based on winning symbol combinations formed across the reels on active (wagered upon) pay lines. For example, if a pay table associated with the gaming system indicated that at least three of the same bar symbols is a winning symbol combination and awards a predetermined payout, the gaming system would evaluate the generated plurality of symbols for bar symbols. If the gaming system generated at least three bar symbols on adjacent reefs and along an active pay line, the gaming system may determine that the three bar symbols is a winning symbol combination based on the predetermined pay table. It should be appreciated that a pay table may include any suitable number of winning symbol combinations and payouts. In one embodiment, a pay table may indicate that as few as one symbol may be associated with a payout. Alternatively, two or more symbols may be used to form winning symbol combinations that result in a payout.

In block 345, the gaming system determines, with the processor, a payout amount based on the evaluated winning symbol combinations across wagered pay lines. As illustrated in block 350, the gaming system may update, with the processor, the player's gaming credit balance in accordance with any award amount. As noted above, the blocks illustrated in FIGS. 3A-3C can be rearranged in any suitable order. As such, it should be appreciated that the gaming system may update player's gaming credit balance at other suitable times.

In one embodiment, as indicated in block 360, if the gaming system determined that the generated plurality of symbols did not result in triggering a bonus game, operation 300 moves to block 362.

In one embodiment, as indicated in block 362, the gaming system may receive a signal to end game play or "cash out" via an input device of the gaming system. In such a situation, the gaming system dispenses a value to the player, through a value dispenser, based on the player's gaming credit balance as illustrated in block 364 and operation 300 ends.

On the other hand, if the gaming system processor has not received a signal to end game play via the player input device, the process of operation 300 returns to block 315 via off page connector B. The gaming system may receive, via a player input device, a wager for another play of the game and continue operation 300 from block 315. However, in one embodiment, the wager may not be accepted if the player has fewer credits than the player's selected wager amount as shown in block 315.

Returning now to block 360, if the gaming system determined that the generated plurality of symbols resulted trigging a bonus game, operation 300 moves to block 366 in FIG. 3C via off page connect C.

Block 366 illustrates one embodiment in which the gaming system may receive a request to initiate a play of the bonus game. The request to initiate the play of the bonus game may be received from a player via a player input device in communication with the gaming system. For example, the player may press a spin button on the gaming system to start spinning reels (or randomly generating symbols) for the play of the bonus game. In an alternative embodiment, the processor of the gaming system may automatically initiate the play of the bonus game.

In one embodiment, the gaming system may use a random number generator to randomly generate a plurality of symbols from a set of symbols for the bonus game as indicated in block 368.

The gaming system may cause the display device to display the plurality of symbols generated as indicated in block 370. The gaming system may display the generated plurality of symbols in visible symbol display areas of each of the reels of the gaming system.

In one embodiment as shown in block 372, the gaming system evaluates the generated plurality of symbols across active pay lines for winning symbol combinations. In some embodiments, gaming system evaluates the winning symbol combinations based on the pay lines wagered upon by a player. The gaming system may evaluate the active pay lines as discussed above in the base game. In one embodiment of the bonus game using reels, the gaming system determines an award amount based on winning symbol combinations formed across the reels on active (wagered upon) pay lines. However, it should be appreciated that in some embodiments, the active pay lines are predetermined or the gaming system selects default pay lines for the evaluation. For example, if a pay table associated with the gaming system indicated that at least three of the same cherry symbols is a winning symbol combination and provides a predetermined payout, the gaming system would evaluate the generated plurality of symbols in the base game for cherry symbols. If at least three cherry symbols were generated on adjacent reels and along an active pay line, the gaming system may determine that three cherry symbols form a winning symbol combination based on the predetermined pay table. It should be appreciated that a pay table may include any suitable number of winning symbol combinations and payouts. In one embodiment, a pay table may indicate that as few as one symbol may be associated with a payout. Alternatively, two or more symbols may be used to form winning symbol combinations that result in a payout.

In block 374, the gaming system determines, with the processor, a payout amount for the play of the bonus game based on the evaluated winning symbol combinations across active pay lines.

At block 378, the gaming system may update, with the processor, the player's gaming credit balance in accordance with any obtained award amount from the play of the bonus game. If the player won free spins, the gaming system may also update a player's bonus game free spin balance in accordance with the quantity of free spin wins (not shown). As noted above, the blocks illustrated in FIGS. 3A-3C can be rearranged in any suitable order. As such, it should be appreciated gaming system may update player's gaining credit balance and bonus game free spin balance at other suitable times.

At block 380, the gaming system determines if the player's bonus game tree spin balance includes remaining free spins. If free spins remain, then the operation 300 may return to block 366 to continue with another play of the bonus game. It should be appreciated that player may cash out at any time, even if free spin balance remains. In some embodiments, the player loses the free spins for cashing out early (e.g., before all free spins are used in the bonus game). In other embodiments, the player retains the free spins in the player's bonus game free spin balance for use in future bonus games.

If no free spins remain, then the operation 300 may proceed via off page connector D and return to block 362 in FIG. 3B. As indicated in block 362, the gaming system may receive a signal to end game play or "cash out" via an input device of the gaming system. In such a situation, as illustrated in block 364, the gaming system dispenses a value to the player through a value dispenser based on the player's gaming credit balance and operation 300 ends.

On the other hand, if the gaming system processor has not received a signal to end game play via the player input device, the process of operation 300 returns to block 315 via off page connector B. The gaming system may receive, via a player input device, a wager for another play of the game and continue operation 300 from block 315. However, in one embodiment, the wager may not be accepted if the player has fewer credits than the player's selected wager amount as shown in block 315.

FIG. 4 illustrates a flowchart of an example operation 400 of one embodiment of the gaming system and method that includes a slide out information area. In one embodiment, the slide out information area can be accessed at any time before, during, or alter a game is played on the gaming system (such as any time during the operation 300 illustrated in FIGS- 3A-3C). In one embodiment, the slide out information area is made available on the same display screen that displays a game. In some embodiments, when the slide out information area is accessed, the slide out information area is visible at the same time as a game, without obscuring the game. Although, in some embodiments, the game may be obscured by the slide out information area. In some embodiments, when the slide out information area is accessed, the slide out information area is visible at the same time as a game, without stopping or otherwise interrupting a play of the game (e.g., a play of the game can continue while the slide out information area is accessed). In some embodiments, the gaming system generates the slide out information area without altering the display of the game, such as without reformatting a displayed game. It should be appreciated that reformatting a display game, such as scaling a game image (to make the game image smaller or larger) is a processor intensive task and negatively impacts the efficiency of gaming system. In some systems that scale displayed images, especially dynamically generated video images, as much as 18% of a processor or video processor could be used. Such intensive processing may cause increased power usage and cause degradations in the playback of a game. Thus, generating the slide out information area without altering the game in some embodiments is important for improving the efficiency of the gaming system while still delivering the slide out information area.

In some embodiments, the slide out information area is generated and displayed along the outer periphery of a displayed game. For example, the gaming system may generate the slide out information area on the left side, right side, top, or bottom of a game screen, while still displaying the entirety of a game or substantially all of a game. In some embodiments, the gaming system generates the slide out information area on one or more of the peripheral areas of a game screen around a displayed game. It should be appreciated that the gaming system can also generate and display the slide out information area in any other suitable screen of the gaming system in alternative embodiments.

As illustrated at block 405, the gaming system may receive a request for information via a player input device.

For example, the player may select an information button on the gaming system or the player may swipe a certain direction on a touch screen of the gaming system to request information.

Figure 7:
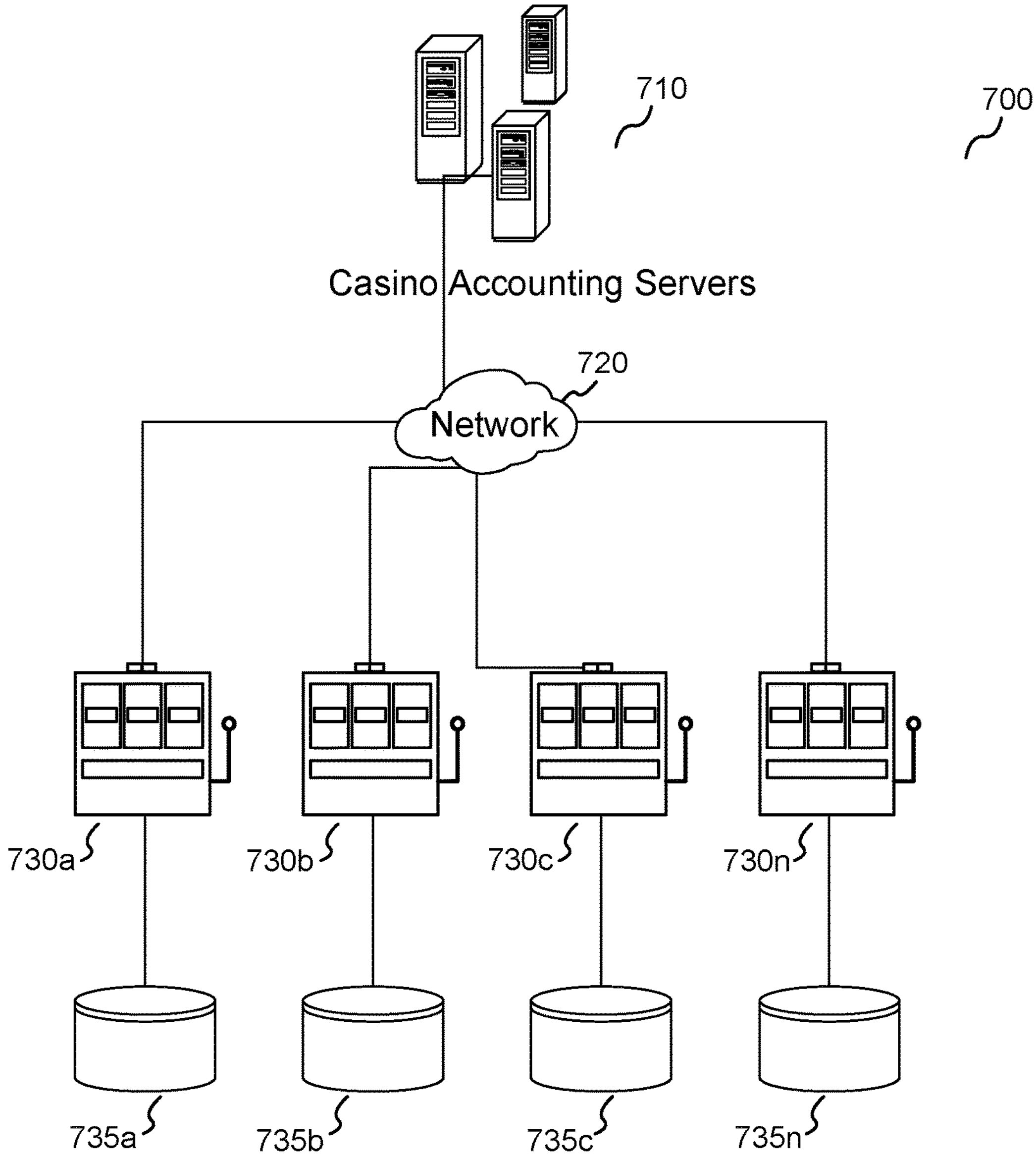
FIG. 7 illustrates one embodiment of a gamins system including a slide out symbol information area displayable with a game in a network environment.
Figure 8:
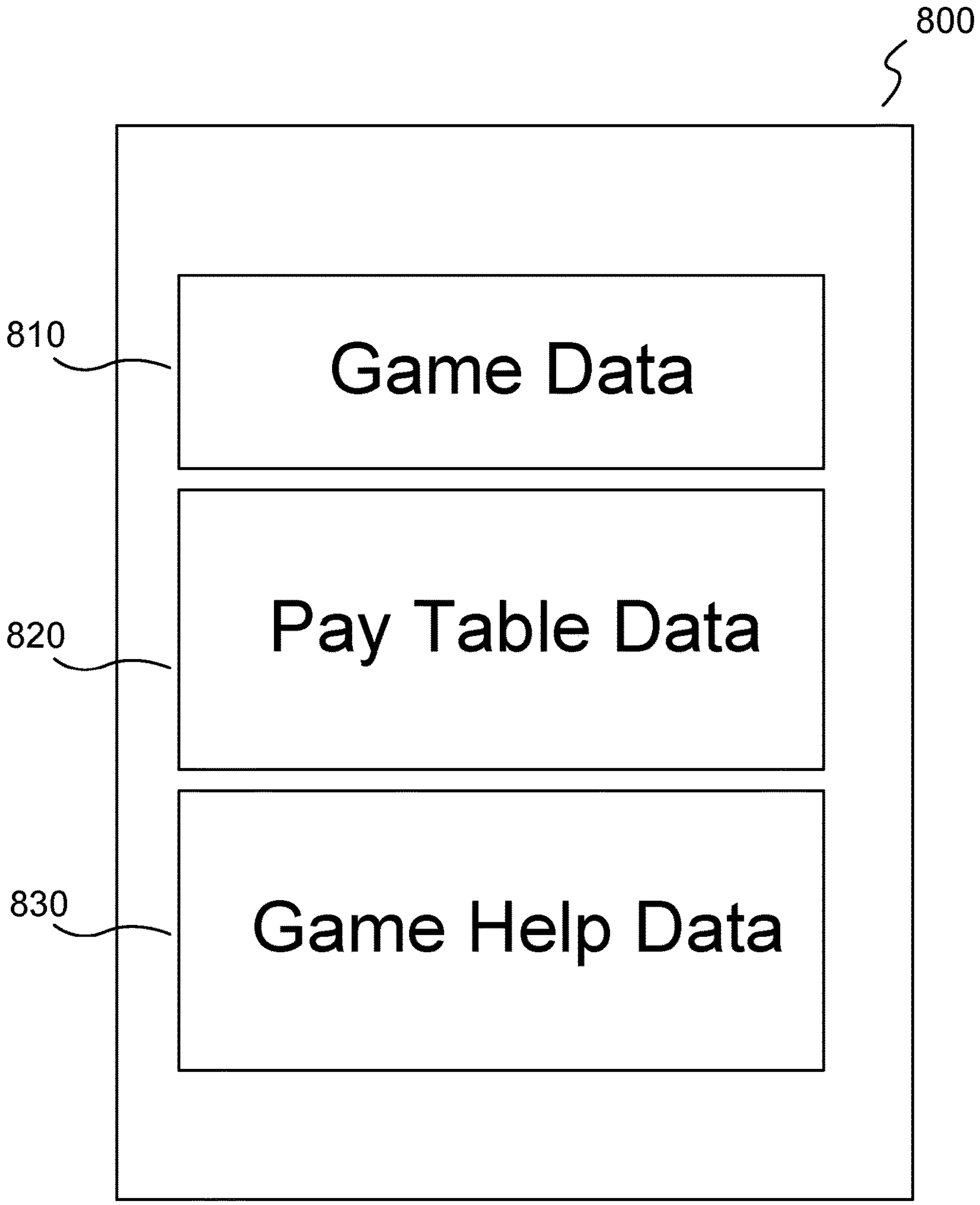
FIG. 8 illustrates one embodiment of storage device of a gaming system including a slide out symbol information area displayable with a game.

As illustrated in block 410, the gaming system may retrieve, with a processor, stored information from one or more data storage locations. For example, if she gaming system displays certain game information such as symbol pay table information in the slide out information area, the gaming system may access one or more data locations that hold the symbol pay table information. As one example, the gaming system may access a local storage drive to access separately stored pay table data 820 as illustrated in data storage container 800 of FIG. 8. As illustrated in FIG. 8, pay table data 820 is store separately from game data 810, and game help data 830. It should be appreciated that the gaming system may access other sources of data for display in the slide out information area in some embodiments. For example, the gaming system may remotely retrieve player tracking information, award information, jackpot information, etc. from a remotely located an accounting system via a local network; the Internet, or other suitable network. One example of gaming systems accessing remotely located casino accounting servers 710 is illustrated in FIG. 7.

Returning to block 415, the gaming system may prepare, with the processor, the retrieved information for display on the gaming system in the slide out information area. The information may include the information discussed above or any other suitable information. In some embodiments, the gaming system may determine how much space is available around a game on display device when determining how to prepare the retrieved information for display. In some such embodiments, the gaming system may further evaluate the type of information retrieved for display with the available space around a game to determine how to prepare the data for display in the slide out information area. In some embodiments, the gaming system determines how to display the retrieved information to minimize the amount of data that is accessed from memory or the number of times data is accessed to improve the efficiency of processor of the gaming system. Reducing the amount of data accessed from memory or reducing the number of times data is accessed saves processor activity and also reduces the amount of video processing that is necessary to display both the game and the slide out information area on the same screen for a more efficient gaming system.

At block 420, in one embodiment, the gaming system displays the prepared information in the slide out information area such that the information can be substantially simultaneously displayed with a game on a display device of the gaming system. In one embodiment, the gaming system displays the prepared information while a game is being played and without interrupting the play of the game. In one embodiment, the gaming system displays the prepared information in the slide out information area without reformatting a visible game. That is, in one such embodiment, the game does not need to be reformatted, such as shrinking the size of the game or down scaling the game to display the prepared information in the slide out information area. In this manner, the processor of the gaming system is more efficiently used because the processor or the video processor is not required to resize or adjust the scale of the game. As noted above, resizing or adjusting the scale of a game is generally a very processor or video processor intensive task that can take as much as 18% of such processors. By avoiding the requirement to resize or adjust the scale of the game using the slide out information area to avoid taxing the processor or video processor of the gaming system, the slide out information area increases the efficiency of the gaming system.

In one embodiment, as shown in block 425, the gaming system may receive a request for additional information via an input device. In one such embodiment, the gaming system may receive a request for information regarding a symbol. For example, a player may request a pay table associated with a symbol. At block 440, the gaming system may determine if the requested information has already been retrieved in memory. If the gaming system determines that the information has not been retrieved or is no longer stored in memory, the gaming system returns to block 410 to retrieve the requested information (if the information is available).

Alternatively, if the gaming system already retrieved the requested information at decision block 440, the process moves to block 445. At block 445, the gaming system may prepare, with the processor, the retrieved information for display on the gaming system in the slide out information area similar to the process described in connection with block 415. For example, if the gaming system already retrieved the pay table associated with a selected symbol, the gaming system will prepare the pay table display in the slide out information area based on the available space of the slide out information area.

In one embodiment, as shown in block 450, the gaming system may display the prepared information in the slide out information area such that the information can be substantially simultaneously displayed with a game on the display device of the gaming system (similar to the process discussed in connection with block 420). The operation 400 ends. However, it should be appreciated that gaming system can continue to retrieve and display information for the slide out information area in response additional requests for information.

Figure 5A:
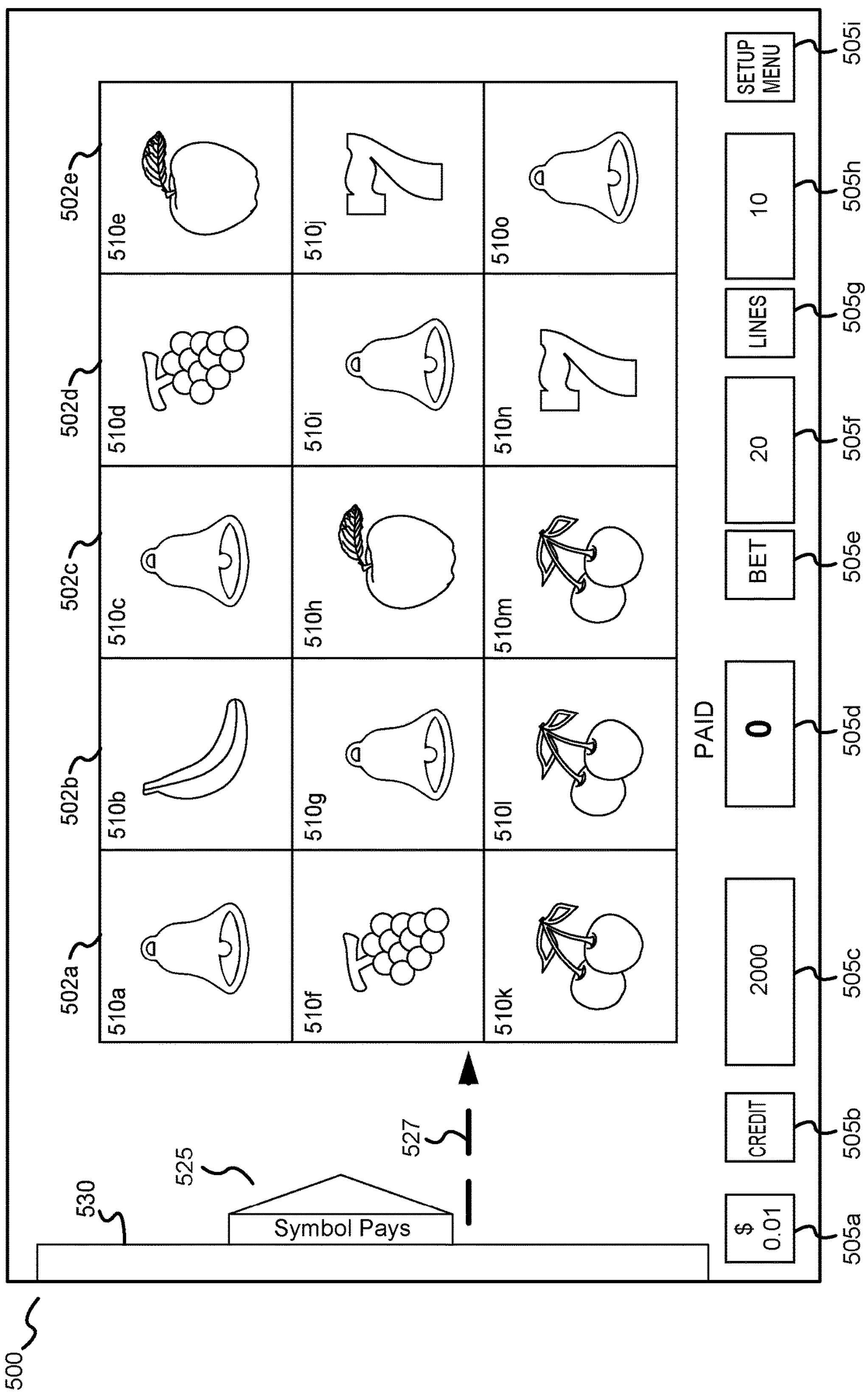
FIGS. 5A, 5B, 5C, 5D, 5E, 5F, 5G, and 5H illustrate screen shots of one embodiment of a gaming system including a slide out symbol information area displayable with a game.

In some embodiments, the slide out information area remains open until the gaming system receives a request (e.g., through a player input device) to close the slide out information area. The request to close the slide out information can be a swipe motion detected on the touch screen of the gaming system, a software or hardware button actuation, or any other suitable mechanism to close the slide out information area. Closing the slide out information area may return the slide out information area to a state such as illustrated in FIG. 5A. In some embodiments, the gaming system closes the slide out information area after a predetermined amount of time, such as 15 seconds, 1 minute, or some other suitable time period. As noted above, it should also be appreciated that operation 400 may be reinitiated at any time to access the slide out information area.

FIGS. 5A-5H, illustrate screen shots of one embodiment of a gaining system having a slide out information area that is displayed with a game, without substantially obscuring the game, and without substantially interrupting the game. It should also be appreciated that in some embodiments, accessing the slide out information area may partially or fully obscure the game and may stop or interrupt the game.

FIG. 5A illustrates one embodiment of a game display 500 that the gaming device 100 may display on a display device. In one embodiment game display 500 may be displayed on first display 122 of gaming device 100 illustrated in FIG. 1. However, any other suitable display may be used. The game display 500 displays a set of a plurality of reels 502*a,* 502*b* 502*c,* 502*d,* and 502*e* as illustrated in FIG 5A. As also illustrated in FIG. 5A, the reels 502*a*-502*e* are displayed substantially side by side. It should be appreciated that reels 502*a*-502*e* can be displayed with any suitable amount of separation or no separation. It should be appreciated that the game shown in game display 500 is merely representative and may have more or fewer game elements shown in the game display 500. It should be appreciated that in some embodiments reels 502*a*-502*e* are virtual video reels. However, in alternative embodiments, the reels may be mechanical or electromechanical. While the games disclosed herein are illustrated as reel based games, it should be appreciated that the slide out information area can be applied to any suitable game and non-game embodiments.

The plurality of reels 502*a*-502*e* are each associated with a set of symbols. Each reel 502*a*-502*e* is associated with a plurality of symbols of the set of symbols. Each reel 502*a*-502*e* can also be associated with the same or a different plurality of symbol combinations from the set of symbols. The set of symbols may include numbers, letters, geometric figures, symbols, images, character, blank symbols (e.g., the absence of symbols), animations, or any other suitable graphical depiction. The symbols in the set of symbols may include pay symbols and special or designated symbols.

Returning now to FIG. 5A, the game display 500 depicts a plurality of symbol display areas 510*a*, 510*b*, 510*c*, 510*d*, 510*e*, 510*f*, 510*g*, 510*h*, 510*i*, 510*j*, 510*k*, 510*l*, 510*m*, 510*n*, and 510*o*. This plurality of symbol display areas can be associated in a manner that provides the appearance of slot reels in a slot machine game. It should also be appreciated that the symbol display areas may not be associated with game reels in some embodiments. As illustrated in FIG. 5A, symbol display areas 510*a*, 510*b*, 510*c*, 510*d*, 510*e*, 510*f*, 510*g*, 510*h*, 510*i*, 510*j*, 510*k*, 510*l*, 510*m*, 510*n*, 510*o* are associated in a manner that provides the appearance of a set of five reels. In one embodiment, the plurality of symbol display areas that provide the appearance of five reels may be arranged in a manner that visibly shows three symbol positions of each of the five game reels. For example, the symbol display areas 510*a*-510*o* are each associated with positions on reels 502*a*-502*e*, respectively. As shown in FIG. 5A, symbol display areas 510*a*, 510*f*, and 510*k* are associated with reel 502*a*; symbol display areas 510*b*, 510*g*, and 510*l* are associated with reel 502*b*; symbol display areas 510*c*, 510*h*, and 510*m* are associated with reel 502*c*; and symbol display areas 510*d*, 510*i*, and 510*n* are associated with reel 502*d*; and symbol display areas 510*e*, 510*j*, and 520*o* are associated with reel 502*e*. The arrangement illustrated in the embodiment of FIG. 5A thus creates a visible display area of the reels 502*a*-502*e* comprising three visible symbol positions for each reel. When viewed together, reels 502*a*-502*e* appear like a 3-row by 5-column reel array in game display 500. In other embodiments, smaller or larger visible areas of the reels can be displayed. That is, the reels 502*a*-502*e* may show fewer or a larger number of visible symbol display areas. While symbol display areas are illustrated with defined boxes, it should be appreciated that in some embodiments, the defined boxes are not visible to the player. It should be appreciated that in some embodiments, the symbol display areas are not defined.

Each reel 502*a*-502*e* may display a plurality of symbols that the gaming system randomly generates from the set of symbols in their respective symbol display areas as illustrated in FIG. 5A. In some virtual reel embodiments, the reels 502*a*-502*e* may be shown spinning to simulate the spinning of mechanical or electromechanical reels. However, it should be appreciated that the reels may be shown spinning in any suitable direction. The reels may also be shown spinning in different directions in some embodiments. In some embodiments, the reels are not shown spinning.

Game display 500 also includes several information areas and buttons 505*a*-505*i*. These information areas and buttons 505*a*-505*i* are illustrated in a particular arrangement, but may be arranged in any suitable manner in different embodiments. In some embodiments, game display 500 may include more or fewer display areas and buttons 505*a*-505*i* than illustrated in FIG. 5A-5H. Information area 505*a* illustrates an example value of one credit for the game displayed in game display 500. Information areas 505*b* and 505*c* illustrate an example of the amount of the player's available credits information area 505*d* illustrates the amount of credits a player has won. Because FIG. 5A. illustrates the start of a play of a game, the information area 505*d* shows zero credits have been won. Button 505*e* illustrates a software button that the player can select to place a bet or wager. It should be appreciated that the functionality of button 505*e* may also be replicated or replaced with a hardware button on the gaming device 100. Information area 505*f* illustrates that the player has selected to wager 20 credits. Button 505*g* illustrates a software button that the player can select to determine how many pay lines to wager on. It should be appreciated that the functionality of button 505*g* may also be replicated or replaced with a hardware button on the gaming device 100. Information area 505*h* illustrates that the player selected to wager on 10 pay lines. Button 505*i* illustrates a software button that the player can select to obtain information about the game, change certain aspects of the game, obtain help, place an order etc.

In one embodiment, if a player selects button 505*i*, the gaming system executes code to open or otherwise activate a slide out information area 530. In an alternative embodiment, as illustrated in FIG. 5A, the gaming system may also enable a player to use a touch screen and digitizer to "swipe" open the slide out information area 530. For example, the gaming system may await the activation of a left to right movement ("a swipe*") on or around virtual button 525 on a touch screen as shown with direction arrow 527. The gaming system may process this swipe as the same or similar to a request to activate the slide out information area 530. As noted above, when activating the slide out information area 530, the gaming system may be configured to provide any suitable information (including providing an additional game) in the slide out information area. However, merely for purposes of illustration. FIG. 5A-5H illustrates an embodiment where slide out information area 530 provides symbol pay information (e.g., pay table information for symbols in a game). In some embodiments, the gaming system may close the slide out information area 530 when the gaming system detects a swipe in the opposite direction.

Depending on the information that will be provided, the gaming system retrieves the information that will be displayed in the slide out information area from various sources as previously discussed.

As noted above, while FIG. 5A-5H illustrate a slide out information area on the left side of the screen, the gaming system can be configured to provide the slide out information area on any side of the screen (including on one or more sides of the screen at a time). In some embodiments, the game displayed or how a game is display may constrain the slide out information area to a particular side of the screen. It should also be appreciated that the slide out information area may be provided on different screens in some embodiments.

Figure 5B:
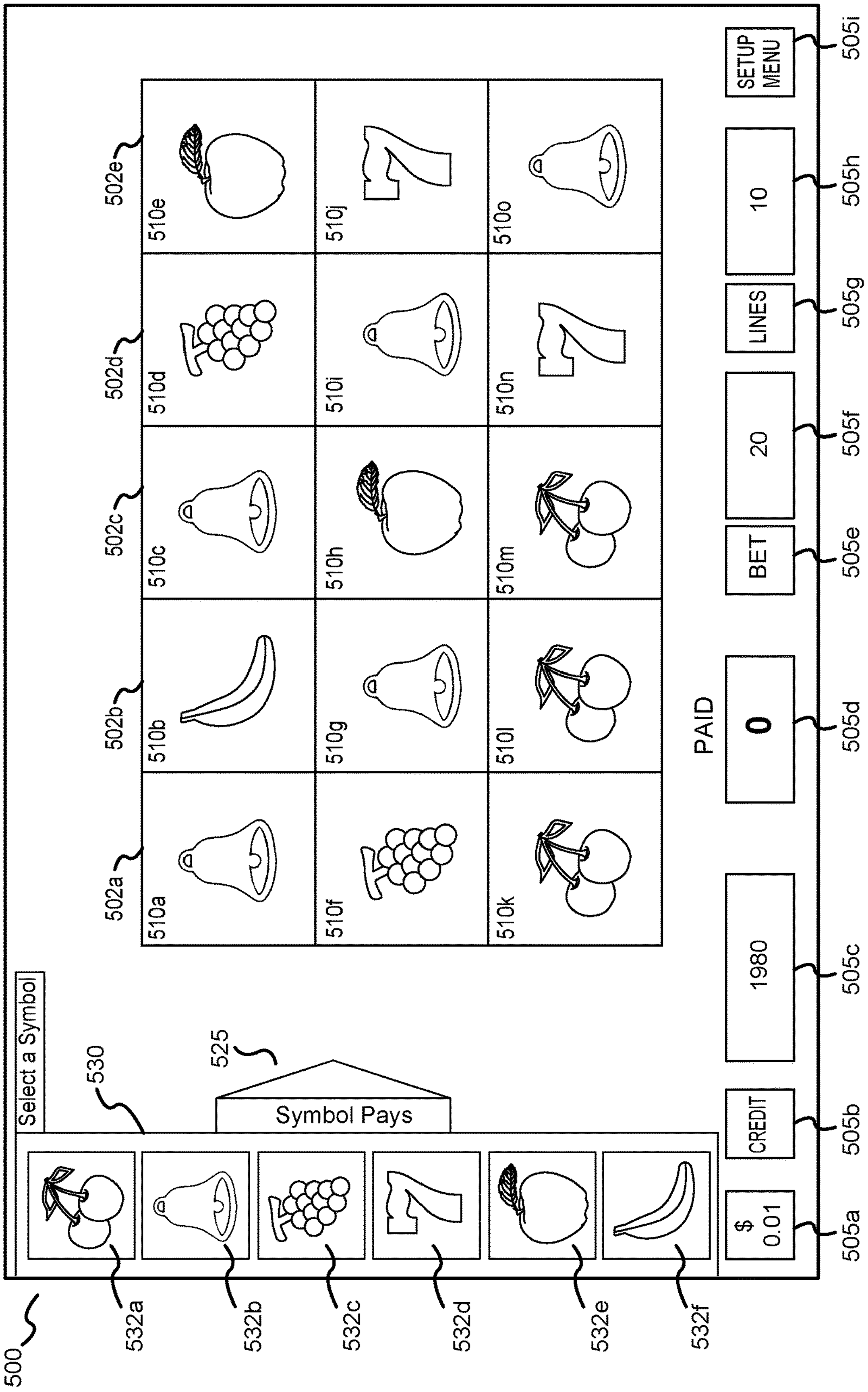

Turning now to FIG. 5B, the gaming system opened the slide out information area to reveal that die gaming system retrieved symbol pay information for display in the slide out information area 530. In one embodiment, the gaming system provides a predetermined quantity of symbols in the slide out information area 530. In the illustrated embodiment, the gaming system displayed six symbols 532*a*, 532*b*, 532*c*, 532*d*, 532*e*, and 532*f* in slide our information area 530. The gaming system enables the player to select one or more of the symbols at a time to obtain information about the symbol as it relates to a game (e.g., the reel game shown in FIG. 5A-5H). In the illustrated embodiment, the symbols shown in slide out information area 530 correspond to symbols generated and displayed on reefs 502*a*-502*e*. In some embodiments, more symbols could be shown in slide out information area 530 to correspond to the different symbols generated for a play of a game. For example, the size of the symbols shown in slide out information area 530 could be reduced to fit more symbols. However, in some embodiments, the number of displayed symbols in slide out information area 530 is predetermined. In some such embodiments, the gaming system enables the player to access more of the game symbols or all of the game symbols, such as by scrolling through the available symbols, as will be shown in the FIGS. 5G and 5H. In some embodiments, more slide out information area 530 may be increased in size to accommodate more displayed symbols (e.g., having more than one row of symbols displayed in slide out information area 530). In other embodiments, slide out information area 530 may include other sides of the display screen around the game to show more information. It should also be appreciated that the manner that the symbols and other information are displayed in FIGS. 5A-5H and FIG. 6A-6E are merely for illustration purposes and the information may be presented in other suitable ways.

Figure 5C:
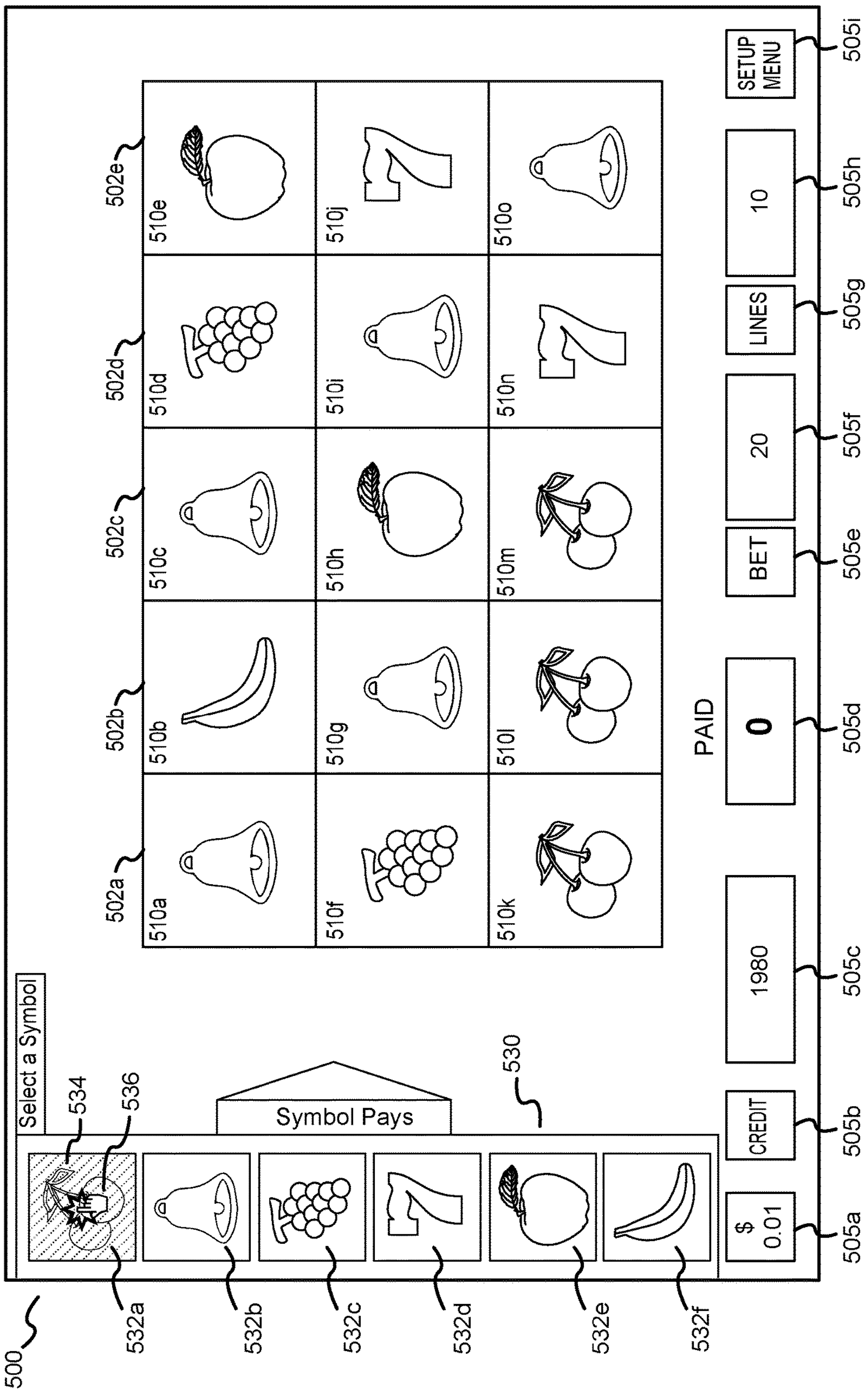

In one embodiment, as illustrated in FIG. 5C, the gaming system enables a player to select Cherry symbol 532*a* for more information. Cursor 536 is shown clicking on Cherry symbol 532*a* to select the symbol for more information. The selection of Cherry symbol 532*a* is further indicated to the player using any suitable mechanism. As illustrated in FIG. 5C, the gaming system provides a highlighting 534 over selected Cherry symbol 532*a*, however, other indicators could be used alone or in conjunction with highlighting 534 (e.g., audio output, highlighted borders with various colors, etc.).

Figure 5D:
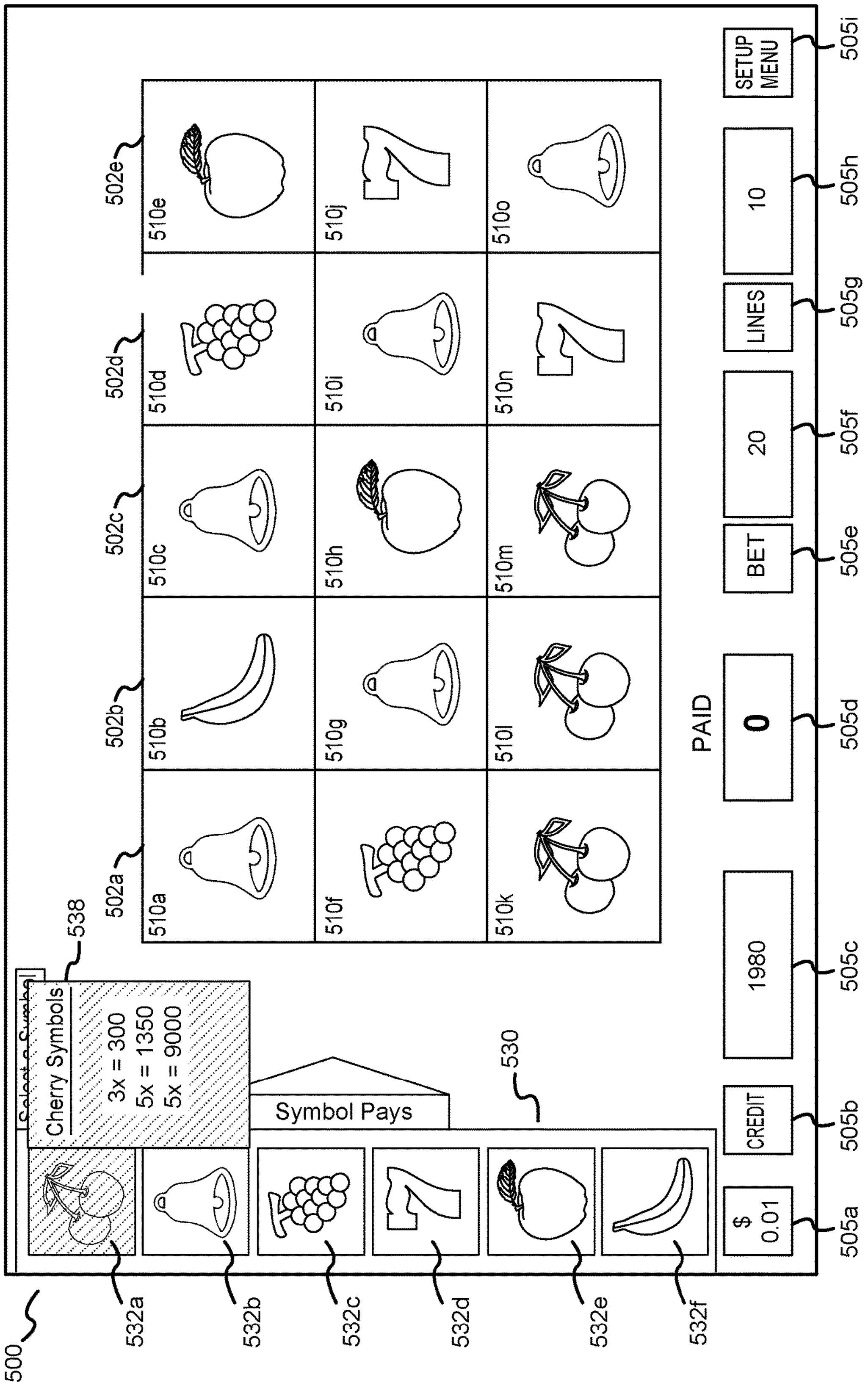

In one embodiment, if additional information is available for the selected Cherry symbol 532*a*, the gaming system displays the available information. As shown in FIG. 5D, the gaming system generates an additional information area 538 showing pay table information for the Cherry symbol 532*a*. In the illustrated embodiment, the pay table information reveals that when the gaming system generates three Cherry symbols on an active pay line, the gaming system will award the player with 300 credits. When the gaming system generates four Cherry symbols on an active pay line, the gaming system will award the player with 1350 credits. When the gaming system generates five Cherry symbols on an active pay line, the gaming system will award the player with 9000 credits. It should be appreciated that the credits shown are merely for illustration purposes and any suitable credits can be assigned to the displayed winning symbol combinations. In some embodiments, the gaming system may display more information about the selected symbol, such as varying credit amounts based on the player's wager. However, in some embodiments, in an effort to save memory and to obtain faster data retrieval times, the gaming system may store only the minimum amount of information on a symbol. For example, if different wager amounts changed the Cherry symbol's pay table, the gaming system may dynamically calculate and update the Cherry's symbol's pay table as displayed in additional information area 538. In one such embodiment, if the player increase the player's bet per active pay line, the Cherry symbol's award amounts may increase. Rather than store all of the different variations of the different award amounts (and require multiple accesses to the data store), the gaming system may dynamically update the displayed pay table as the player alters the bet amount per active pay line. Thus, it should be appreciated that the dynamic updating system more efficiently utilizes the gaming system's hardware resources.

Figure 5E:
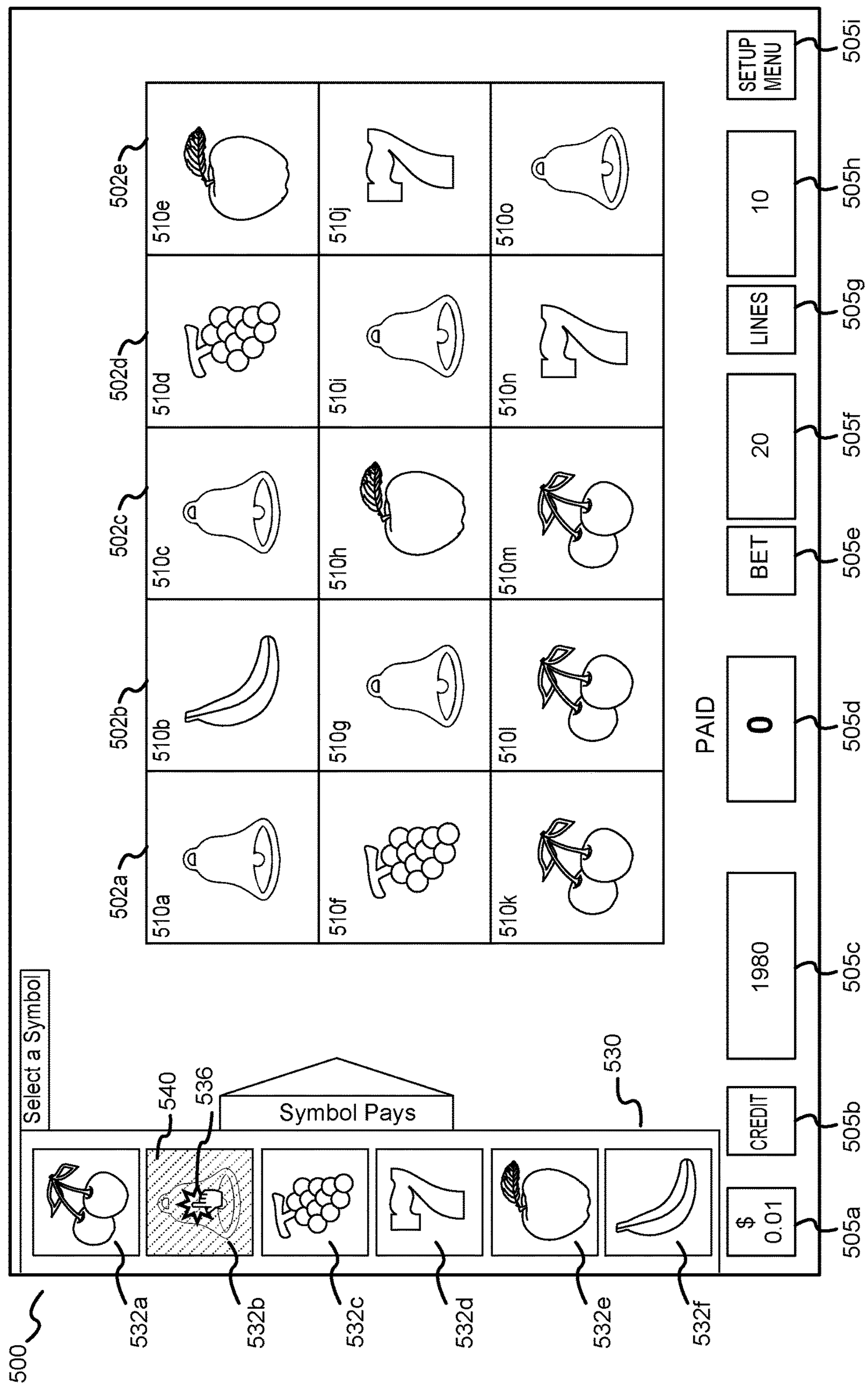

As further illustrations of the features of the slide out information area, FIG. 5E illustrates the gaming system enabling the player to select the Bell symbol 532*b* for more information. Cursor 536 is shown clicking on Bell symbol 532*b* to select the symbol for more information. In FIG. 5E, the information regarding Cherry symbol 532*a* was removed from the screen. In some embodiments, the information regarding a particular symbol is removed after a predetermined amount of time. In alternative embodiments, the information regarding a particular symbol is removed after the gaming system receives a selection of another symbol (e.g., selection of the Bell symbol 532*b*). As with the Cherry symbol 532*a*, the selection of Bell symbol 532*b* is further indicated to the player using highlighting 540.

Figure 5F:
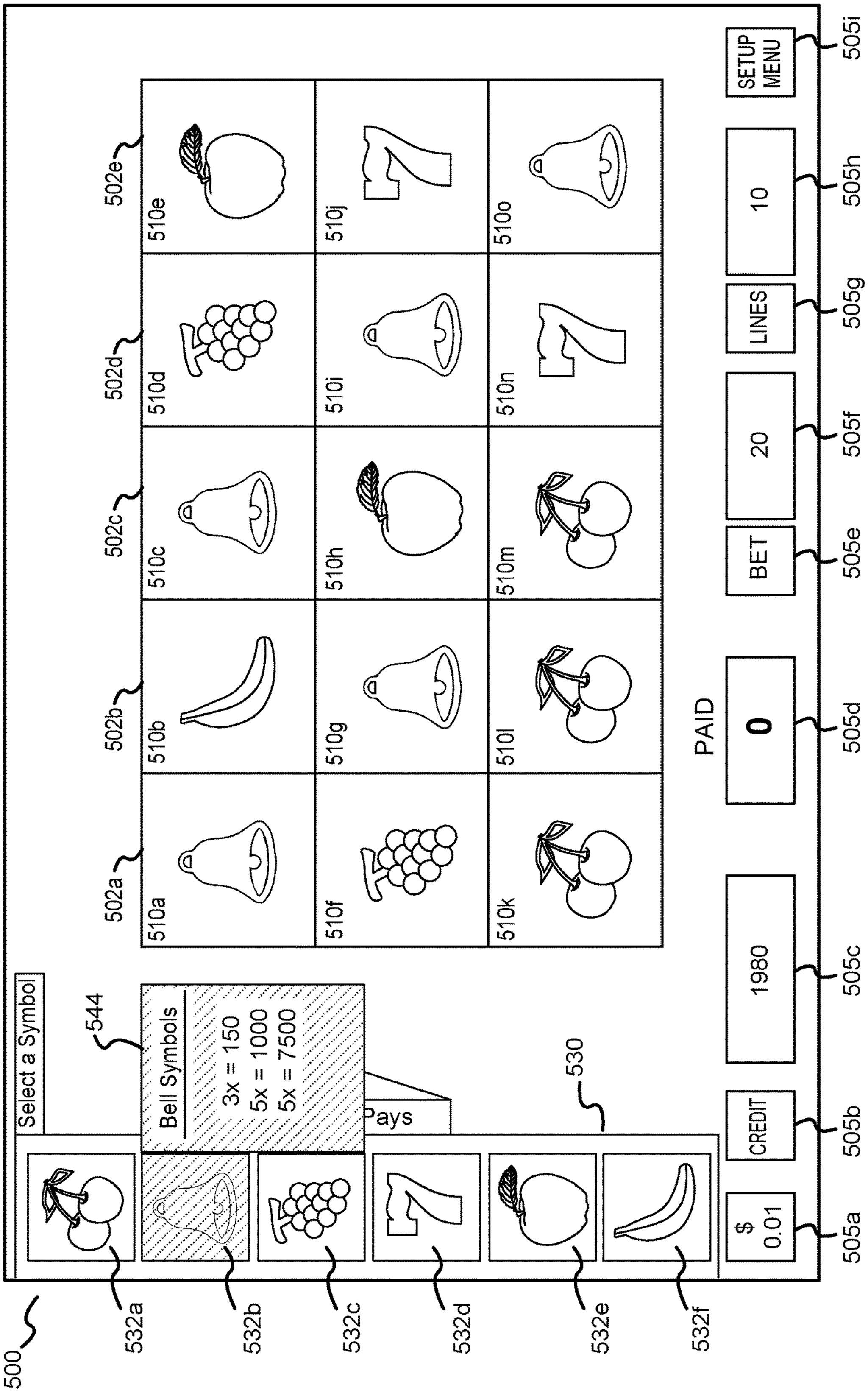

In one embodiment, if additional information is available for the selected Bell symbol 532*b*, the gaming system displays the available information. As shown in FIG. 5F, the gaming system generates an additional display area 544 showing pay table information for the Bell symbol 532*b*. In the illustrated embodiment, the pay table information reveals that when the gaming system generates three Bell symbols on an active pay line, the gaming system will award the player with 150 credits. When the gaming system generates four Bell symbols on an active pay line, the gaming system will award the player with 1000 credits. When the gaming system generates the Bell symbols on an active pay line, the gaming system will award the player with 7500 credits. It should be appreciated that the credits shown are merely for illustration purposes and any suitable credits can be assigned to the displayed winning symbol combinations.

In some embodiments, it should be appreciated that the gaming system can generate information displays for more than symbol at a time. For example, if a player selected both the Cherry symbol 532*a* and the Bell symbol 532*b*, the gaming system may display pay table information for both symbols at the same or substantially the same time.

Figure 5G:
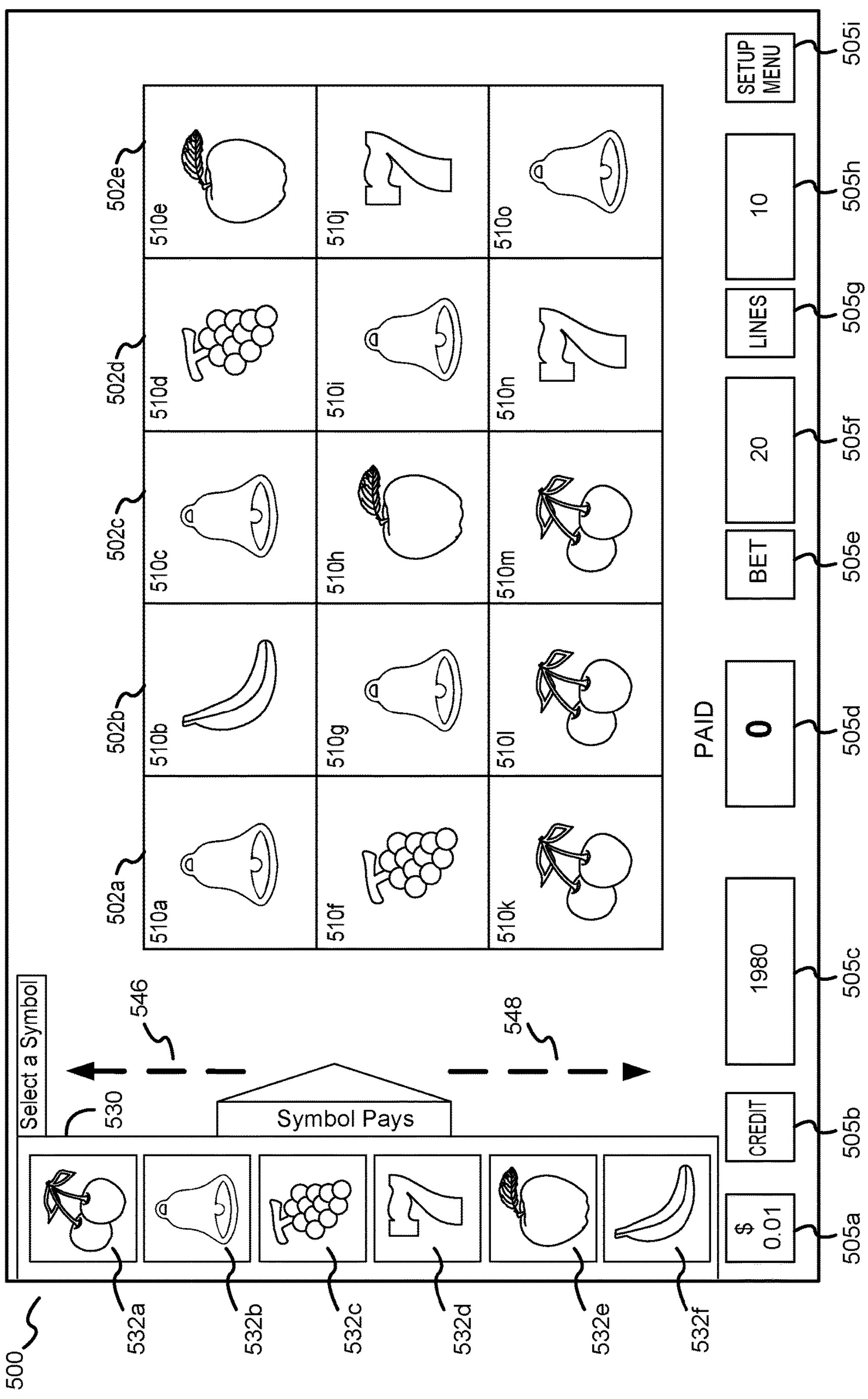

In some embodiments where gaming system can provide more information in slide out information area 530 than can be displayed at one time, the gaming system enables the player to scroll through the additional information. As illustrated in FIG. 5G, the gaming system may detect swipe motions in the directions shown with directional arrows 546 and 548. If the gaming system detects a swipe motion in one of the directions and additional information is available tor display in slide out information area 530, the gaming system will display more information commensurate in scope with the detected swipe motion on the touch screen digitizer. For example, faster swipe motions may cause more new symbols to be displayed than a slower swipe motion. In alternative embodiment, the gaming system may enable the player to access the additional unseen information using software or hardware buttons (not shown) to scroll through the additional non-visible information.

Figure 5H:
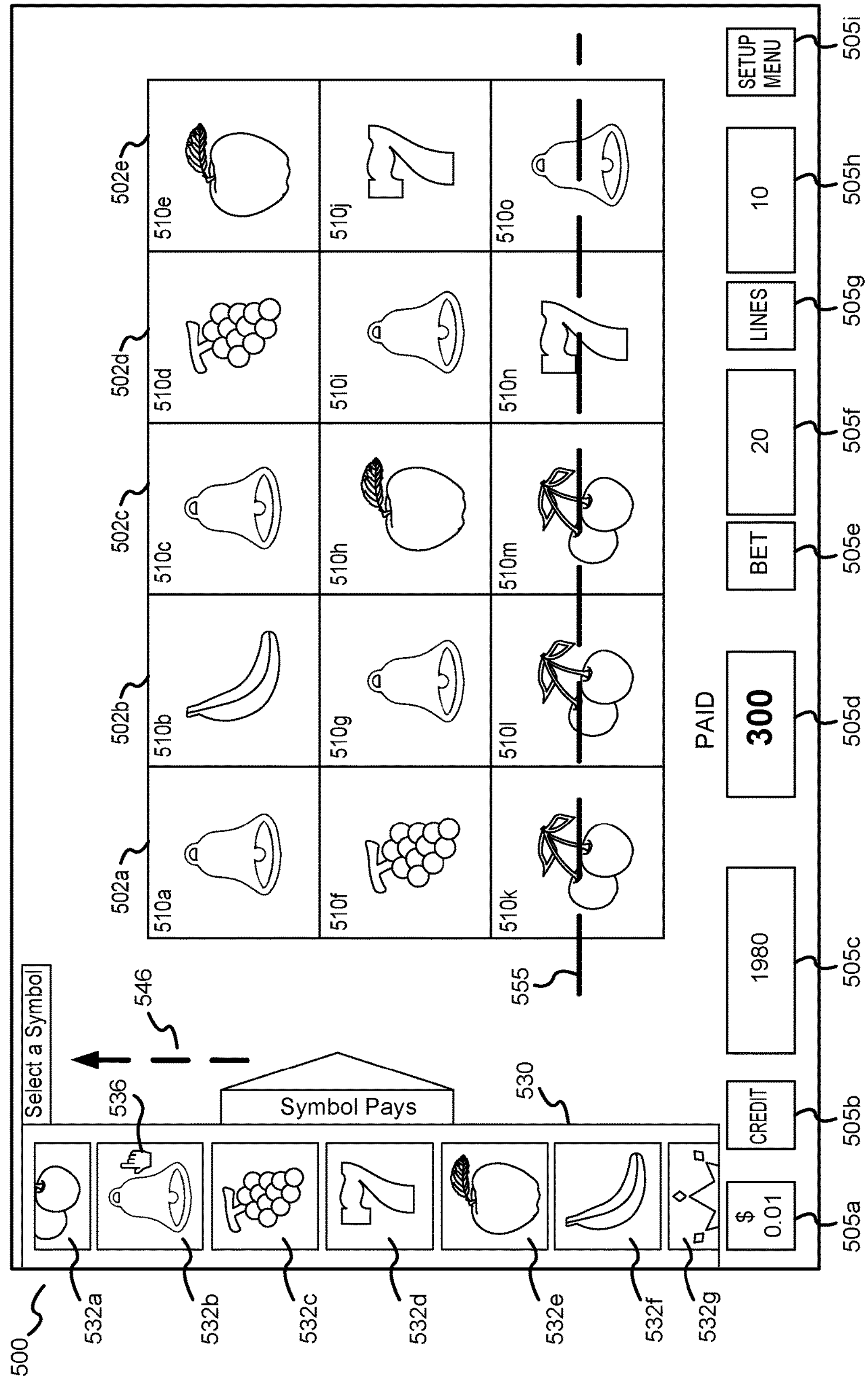

FIG. 5H illustrates one embodiment of the gaming system that detects swipe motions and enables the player to scroll through additional information in the slide out information area 530. In this illustration, the gaming system detected a swipe motion in a direction associated with directional arrow 546 on the touch screen digitizer on or near slide out information area 530. As such, the gaming system shifted the previously displayed symbols 532*a*-532*f* up to reveal that additional game symbols were available tor review. The gaming system may enable a player to select the additional displayed symbols and obtain additional information regarding these symbols similar to the manner discussed above.

To further illustrate the point that slide out information area 530 works with a game, while accessing the slide out information area, a player can provide the gaming system with a deposit of value, using one of the suitable mechanisms discussed above to Man a gaining session. The gaming system receives and validates the player's deposit of value. The gaming system can then issue credits (or gaming credits) to the player based on the received value. The credits enable the player to initiate a play of a game and to also place wagers on a play of the game. The gaming system may provide a visual indication of the player's credit balance to the player as discussed above in information area 505*c*.

To initiate a play of a game, the player activates or presses one or more appropriate buttons on the gaming system to deduct credits necessary to play the game and to identify the player's wager. Along with receiving the player's wager, the gaming system may receive pay line selections or other game functions the player wishes to activate in exchange for the wager. The player may also actuate a game start button or a spin button. The gaming system may deduct the appropriate credits from the player's credit balance after the wager or at any suitable time.

Upon receipt of the player's wager and activation of the game start button, the gaining system may show a display of spinning reels for each of the reels 502*a*-503*e*. The spinning may appear to occur in a vertical top to bottom direction or in a vertical bottom to top direction, or in a combination of vertical directions (not shown). In one embodiment, the gaming system randomly generates symbols from the first set of symbols for reels 502*a*-502*e*, respectively. As noted above, the gaming system may rely on random generation performed by a pseudo RNG, a true RNG, or hardware RNG. In one embodiment, the gaming system may also update the player's credit meter (information area 505*c*) to reflect the player available credit balance. As shown in FIG. 5B, the player's credit meter (information area 505*c*) was decremented by 200 credits from 2180 to 1980 to reflect the 200 credit wager the player placed for the play of the game.

The gaming system displays the generated symbols in symbol display areas 510*a*-501*o* as illustrated in FIG. 5A-5H. The generated symbols displayed on reels 502*a*-502*e* illustrate the randomly generated symbols after the reels have stopped spinning.

As illustrated in FIG. 5A, the gaming system generated and displayed Bell symbols, Banana symbols, Grape symbols, Apple symbols, Cherry symbols, and a Seven symbol in the game display 500. It should be appreciated that the displayed symbol combinations are merely for explanatory purposes and the gaming system may randomly generate any suitable combination of symbols based on defined symbol sets FIG. 5H illustrates one embodiment of a gaming system executing an evaluation of the generated symbols on reels 502*a*-502*e* for winning symbol combinations. As noted above, the player may have wagered on one or more pay lines (such as 10 pay lines shown in information area 505*h*). In one embodiment, at least the active (or wagered on) pay lines are evaluated for winning symbol combinations. Any suitable number of pay lines may be used to evaluate winning symbol combinations.

In the embodiment illustrated in FIG. 5H, the gaming system evaluated the displayed symbol combinations for winning symbol combinations. In FIG. 5H, the gaming system determined that a winning symbol combination is displayed across one wagered pay line. The pay line spans across a horizontal direction of symbol display areas including symbol display areas 510*k*, 510*l*, and 510*m*. In this embodiment, the gaming system displayed three Cherry symbols along an active horizontal pay line. Thus, the gaming system determined the three Cherry symbols form a winning symbol combination based on a pay table associated with the gaming system. The winning pay line is illustrated as pay line 555 in FIG. 5H across the winning row of reels 502*a*-502*e*.

The gaming system in one embodiment provides the player with information regarding all of the awards for the play of the game. In this embodiment, the gaming system alerts the player that the player won 300 credits for the winning combination of three Cherry symbols on an active pay line. In some embodiments, the gaming system may break down how the player won the credits. For example, the gaming system may describe that the three Cherry symbols along an active pay line pays 300 credits (e.g., based on the pay table illustrated in FIG. 5D). In some embodiments, the gaming system may open slide out information area to provide additional details about how the player won the 300 credits to ensure that the player understood the award and to increase the player's excitement for the next play of the game where Cherry symbols appear.

As illustrated in FIG. 5H, the gaming system awards the appropriate number of credits to the player and updates the player's win meter (shown in information area 505*d*) to reflect the player's winnings during the play of the game. In one embodiment, the gaming system may also update the player's credit meter (information area 505*c*) to reflect the player's available credit balance. As illustrated in FIG. 5H, in one embodiment, the credit balance has not yet been updated.

If the player did not win a bonus game, the player may continue the gaming session by playing another game. That is, the player may place another wager and start a new play of the game as noted above. However, continued game play is dependent of the number of credits remaining in the player's credit balance. The player may also choose the cash out. In such an instance, the gaining system provides the player a value based on the player's credit balance using any of the value items discussed above (bills, coins, vouchers, etc.).

It should now be appreciated that the slide out information area 530 is advantageous because the player can play a game and keep the game visible (and even continue to play additional games), while substantially simultaneously learning about features in a game. In some embodiments, the slide out information area 530 and provided information does not alter the size of the displayed game. In some embodiments, the slide out information area 530 and provided information does not obscure the game, does not cause the game to pause or stop, and does not otherwise interfere with game play. This is important in some embodiments because, some measures of success of a gaming system are game throughput (a player's time on a gaming system and the quantity of games played per minute). Game operators seek to have a player execute about seven plays of a game per minute. If a player must stop plays of a game to seek information about game symbols, then gaming system will fall below the sought after game throughput. If the player must drastically change the player's gaze to a different screen, the player will generally stop plays of a game, and impact the game throughput. However, by utilizing the slide out information area, the player can maintain their gaze on the same screen and continue to play games, while also satisfying the player's requirement for information and increasing the player's knowledge and enjoyment of a game.

FIGS. 6A-6E, illustrate screen shots of another embodiment of a gaming system having a slide out information area with a plurality of different sources of information that are displayed with a game, without obscuring the game, and without interrupting the game.

Figure 6A:
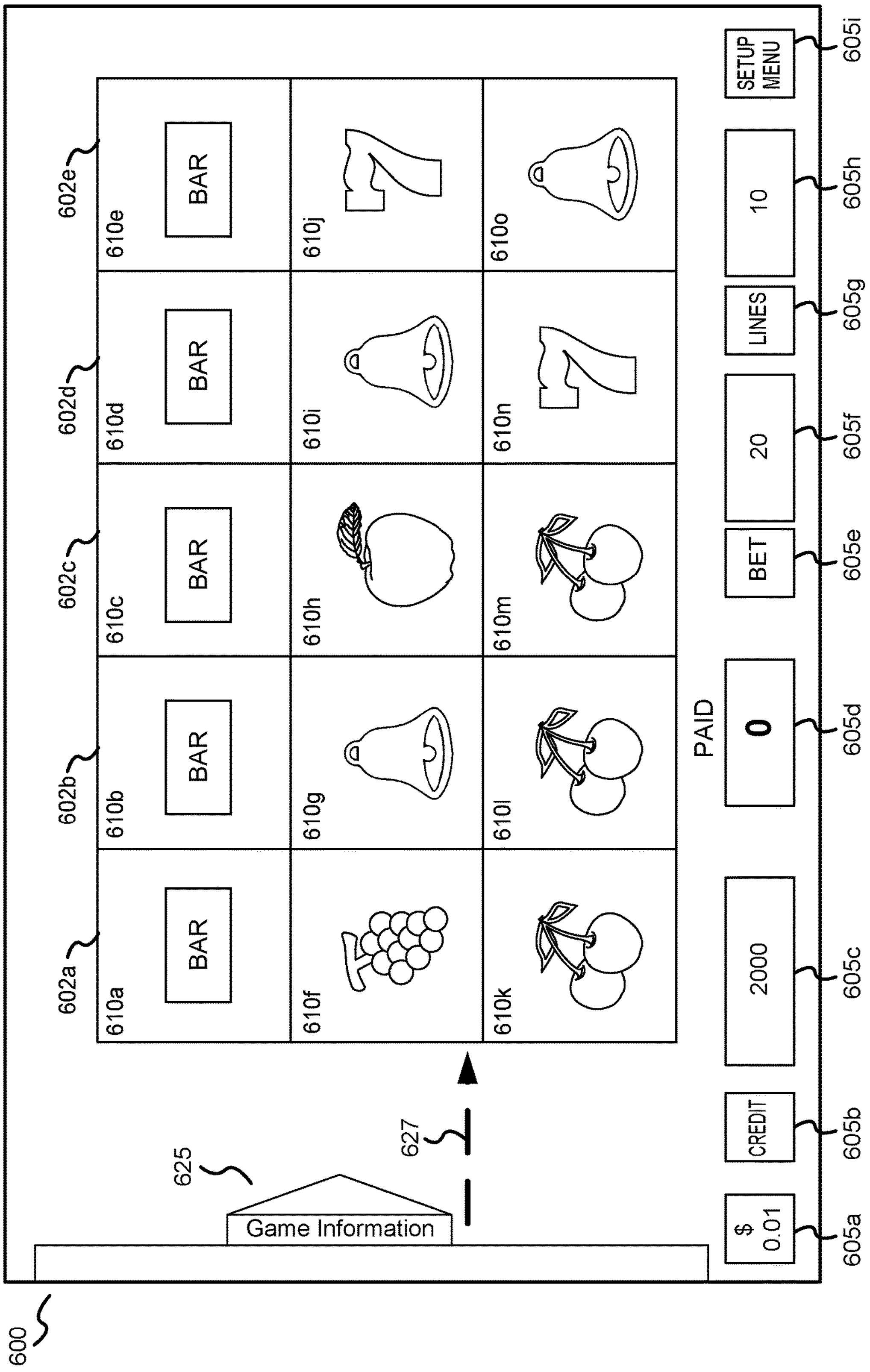
FIGS. 6A, 6B 6C, 6D, and 6E illustrate screen shots of one embodiment of a gaming system including a slide out information area displayable with a game.

FIG. 6A illustrates one embodiment of a game display 600 that the gaming device 100 may display on a display device. In one embodiment, game display 600 may be displayed on first display 122 of gaming device 100 illustrated in FIG. 1. However, any other suitable display may be used. The game display 600 displays a set of a plurality of reels 602*a*, 602*b*, 602*c*. 602*d*, and 602*e* as illustrated in FIG 6A. As also illustrated in FIG. 6A, the reels 602*a*-602*e* are displayed substantially side by side. It should be appreciated that reels 602*a*-602*e* can be displayed with any suitable amount of separation or no separation. It should be appreciated that the game shown in game display 600 is merely representative and may have more or fewer game elements shown in the game display 600.

The plurality of reels 602*a*-602*e* are each associated with a set of symbols. Each reel 602*a*-602*e* is associated with a plurality of symbols of the set of symbols. Each reel 602*a*-602*e* can also be associated with the same or a different plurality of symbol combinations from the set of symbols. The set of symbols may include numbers, letters, geometric figures, symbols, images, character, blank symbols (e.g., the absence of symbols), animations, or any other suitable graphical depiction.

Returning now to FIG. 6A, the game display 600 depicts a plurality of symbol display areas 610*a*, 610*b*, 610*c*, 610*d*, 610*e*, 610*f*, 610*g*, 610*h*, 610*i*, 610*j*, 610*k*, 610*l*, 610*m*, 610*n*, and 610*o*. This plurality of symbol display areas can be associated in a manner that provides the appearance of slot reels in a slot machine game. It should also be appreciated that the symbol display areas may not be associated with game reels in some embodiments. As illustrated in FIG. 6A, symbol display areas 610*a*, 610*b*, 610*c*, 610*d*, 610*e*, 610*f*, 610*g*, 610*h*, 600*i*, 610*j*, 610*k*, 610*l*, 610*m*, 610*n*, 610*o* are associated in a manner that provides the appearance of a set of five reels. In one embodiment, the plurality of symbol display areas that provide the appearance of five reels may be arranged in a manner that visibly shows three symbol positions of each of the five game reels. For example, the symbol display areas 610*a*-601*o* are each associated with positions on reels 602*a*-602*e*, respectively. As shown in FIG. 6A, symbol display areas 610*a*, 610*f*, and 610*k* are associated with reel 602*a*; symbol display areas 610*b*, 610*g*, and 610*l* are associated with reel 602*b*; symbol display areas 610*c*, 610*h*, and 610*m* are associated with reel 602*c*; and symbol display areas 610*d*; 610*i*, and 610*n* are associated with reel 602*d*; and symbol display areas 610*e*, 610*j*, and 620*o* are associated with reel 602*e*. The arrangement illustrated in the embodiment of FIG. 6A thus creates a visible display area of the reels 602*a*-602*e* comprising three visible symbol positions for each reel. When viewed together, reels 602*a*-602*e* appear like a 3-row by 5-column virtual reel array in game display 600. In other embodiments, smaller or larger visible areas of the reels can be displayed. That is, the reels 602*a*-602*e* may show fewer or a larger number of visible symbol display areas. While symbol display areas are illustrated with defined boxes, it should be appreciated that in some embodiments, the defined boxes are not visible to the player. It should be appreciated that in some embodiments, the symbol display areas are not boxes and are not predefined (e.g., gaming system may place generated symbols in suitable positions along the virtual video reels).

Each reel 602*a*-602*e* may display a plurality of symbols that the gaming system randomly generates from the set of symbols in their respective symbol display areas as illustrated in FIG. 6A. In some virtual video reel embodiments, the reels 602*a*-602*e* may be shown spinning to simulate the spinning of mechanical or electromechanical reels. However, it should be appreciated that the reels may be shown, spinning in any suitable direction. The reels may also be shown spinning in different directions in some embodiments- In some embodiments, the reels are not shown spinning.

Game display 600 also includes several information areas and buttons 605*a*-605*i*. These information areas and buttons 605*a*-605*i* are illustrated in a particular arrangement, but may be arranged in any suitable manner in different embodiments. In some embodiments, game display 600 may include more or fewer display areas and buttons 605*a*-605*i* than illustrated in FIG. 6A-6H. Information area 605*a* illustrates an example value of one credit for the game displayed in game display 600. Information areas 605*b* and 605*c* illustrate an example of the amount of the player's available credits. Information area 605*d* illustrates the amount of credits a player has won. Because FIG. 6A illustrates the start of a play of a game, the information area 605*d* shows zero credits have been won. Button 605*e* illustrates a software button that the player can select to place a bet or wager. It should be appreciated that the functionality of button 605*e* may also be replicated or replaced with a hardware button on the gaming device 100. Information area 605*f* illustrates that the player has selected to wager 20 credits. Button 605*g* illustrates a software button that the player can select to determine how many pay lines to wager on. It should be appreciated that the functionality of button 605*g* may also be replicated or replaced with a hardware button on the gaming device 100. Information area 605*h* illustrates that the player selected to wager on 10 pay lines. Button 605*i* illustrates a software button that the player can select to obtain information about the game, change certain aspects of the game, obtain help, place an order, etc.

In one embodiment, if a player selects button 605*i*, the gaming system executes code to open or otherwise activate a slide out information area 630. In an alternative embodiment, as illustrated in FIG. 6A, the gaming system may also enable a player to use a touch screen digitizer to "swipe" open the slide out information area 630. For example, the gaming system may await the activation of a left to right swipe on or around virtual button 625 on a touch screen as shown with direction arrow 627. The gaming system may process this swipe as the same or similar to a request to activate the slide out information area 630. As noted above, when activating the slide out information area 630, the gaming system may be configured to provide any suitable information (including providing an additional game) in the slide out information area. However, merely for purposes of illustration, FIG. 6A-6E illustrates an embodiment where slide out information area 630 provides a plurality of different information and functions such as, but not limited to, game information and service order functions. In some embodiments, the gaming system may close the slide out information area 630 when the gaming system detects a swipe in the opposite direction, Depending on the information that will be provided in the slide out information area, the gaming system retrieves the information that will be displayed in the slide out information area from various sources as previously discussed.

As noted above, while FIG. 6A-6E illustrate a slide out information area on the left side of the screen, the gaming system can be configured to provide the slide out information area on any side of the screen (including on one or more sides of the screen at a time). In some embodiments, the game displayed or how a game is display may constrain the slide out information area to a particular side of the screen. It should also be appreciated that the slide out information area may be provided on different screens in some embodiments.

Figure 6B:
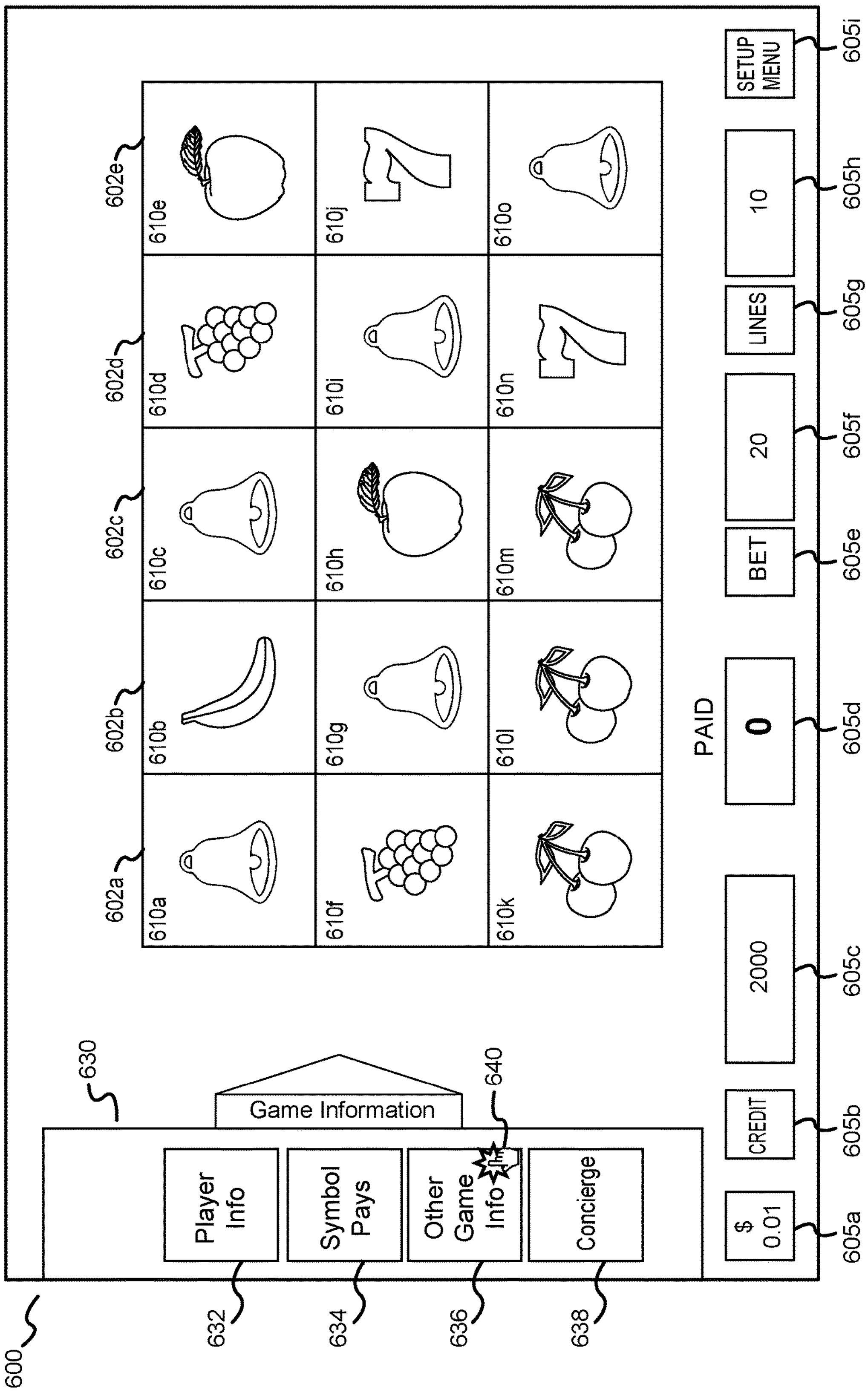

Turning now to FIG. 6B, in response to a detected swipe around virtual button 625 in the direction of arrow 627, the gaming system opened the slide out information area to reveal that the gaming system retrieved a plurality of different game information selections and a concierge function for display in the slide out information area 630. In one embodiment, the gaming system provides a predetermined quantity of selections in the slide out information area 630. In the illustrated embodiment, the gaming system displayed four buttons 632, 634, 636, and 638 in slide out information area 630. It should be appreciated that other suitable information or functions can be displayed in the slide out information area 630.

The gaming system enables the player to select one of the four selections to obtain more information as it relates to a game (e.g., the reel game shown in FIG. 6A-6E) or concierge service. In the illustrated embodiment, selecting the player info button 632 may cause the gaming system to retrieve player information based on a player tracking card (that has been inserted into or associated with the gaming system) and also request information from a casino accounting servers 710 (as illustrated in FIG. 7). The gaming system may retrieve information from the casino accounting servers 710, such as free games that the player has previously been awarded. The gaming system may alert the player to the tree games in the slide out information area 630 and allow the player to redeem the free games to play the game shown in game display 600. In one embodiment, the symbol pays button 634 may cause the gaming system to retrieve and display symbol pay table information, such as discussed in FIGS. 5A-5H.

Figure 6C:
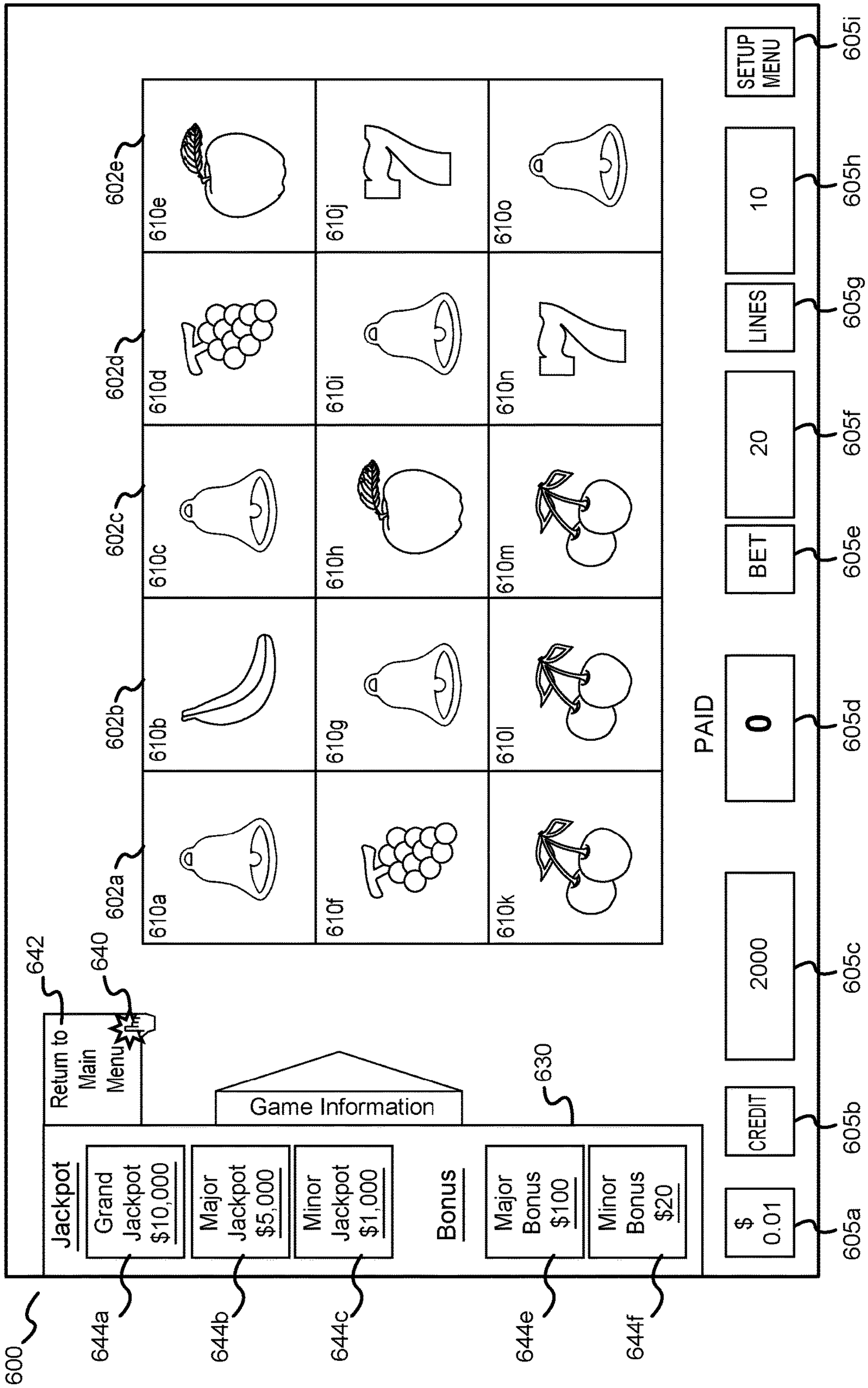

In the illustrated embodiment, selecting the other game info button 636 may cause the gaming system to retrieve and display game information other than symbol pay tables. As illustrated in FIG. 6B, a touch screen digitizer of the gaming system detects that a player selected game info button 636 (shown by the actuation of the cursor 640). Turning to FIG. 6C, the gaming system retrieved jackpot information and bonus information for display in slide out information area 630. The gaining system displayed three jackpots 644*a*, 644*b*, and 644*c* as well as bonus 644*e*, and 644*f*. It should be appreciated that fewer or more game information can be displayed in slide out information area 630. The gaming system can display more information in the manner discussed above with respect to FIGS. 5A-5H. In one embodiment, the gaming system retrieves the jackpot and bonus information from a remote system such as casino accounting servers 710. In some embodiments (not shown), the gaming system may enable the player to select each of the jackpot and bonus information displays to obtain more information. For example, if the player selected the Grand Jackpot 644*a*, the gaming system may display information about how to obtain the Grand Jackpot 644*a*. For example, the gaming system may provide the particular symbol combination or combinations that must be generated in a game to obtain the Grand Jackpot 644*a*. In some embodiments, the player may decide to leave the information on how to obtain the Grand Jackpot 644*a* displayed while the player executes one or more games. Keeping game information about the Grand Jackpot 644*a* available while the player plays games enhances the player's excitement about the progress of plays of a game. For example, the slide out information area keeps the Grand Jackpot information in close proximity to the game so the player can concentrate on the game without having to shift the player's gaze far from the game screen to be reminded of symbol combinations necessary to obtain the Grand Jackpot. Thus, the player can be easily reminded of the Grand Jackpot information while playing she game. In some embodiments, the player can see the Grand Jackpot information in the player's peripheral vision so that the player can continue to play the game without turning attention away from the game.

In some embodiments, where the player requires other information or service, the gaming system may enable the player to return to a previous menu through button 642. However, as noted above in connection with FIGS. 4 and 5A-5H, gaming system may close the open slide out information area automatically at any suitable time (such as returning the slide out information area 630 to the state shown in FIG. 6A). In the illustrated embodiment, the player selects the Return to Main Menu button 642 as shown with cursor 640.

Figure 6D:
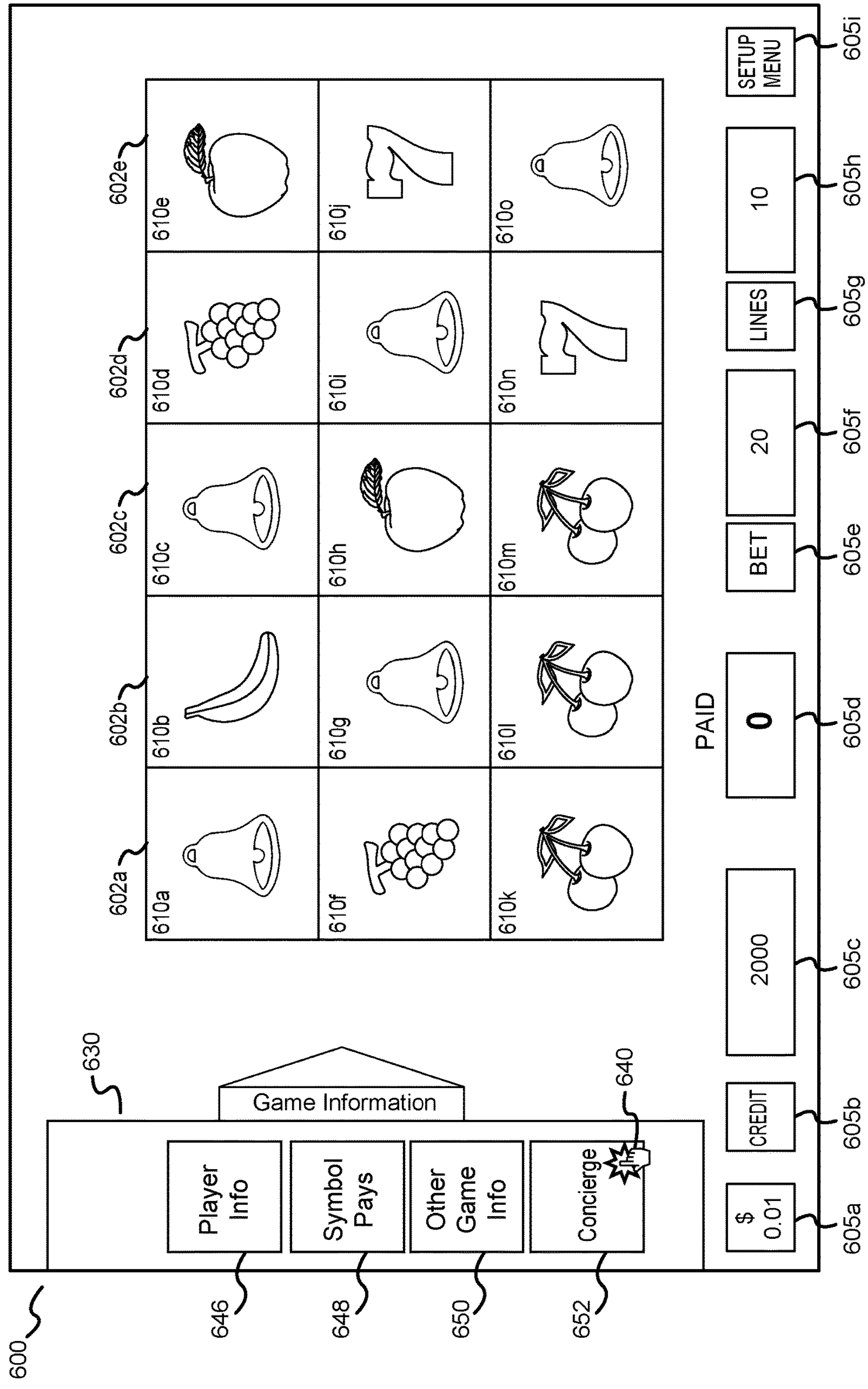

After returning to the main menu, as illustrated in FIG. 6D, the gaming system may offer the player the same selections noted in FIG. 6B. In some embodiments, the selections are dynamically generated. For example, if the gaming system receives a message for the player, returning to the main menu may cause an additional selection to appear, such as a message alert button (not shown). In the illustrated embodiment, the player selects the concierge button 638 as shown with activation of the cursor 640. The selection of the concierge button 638 may cause the gaming system to retrieve and display other information or offer services to a player.

Figure 6E:
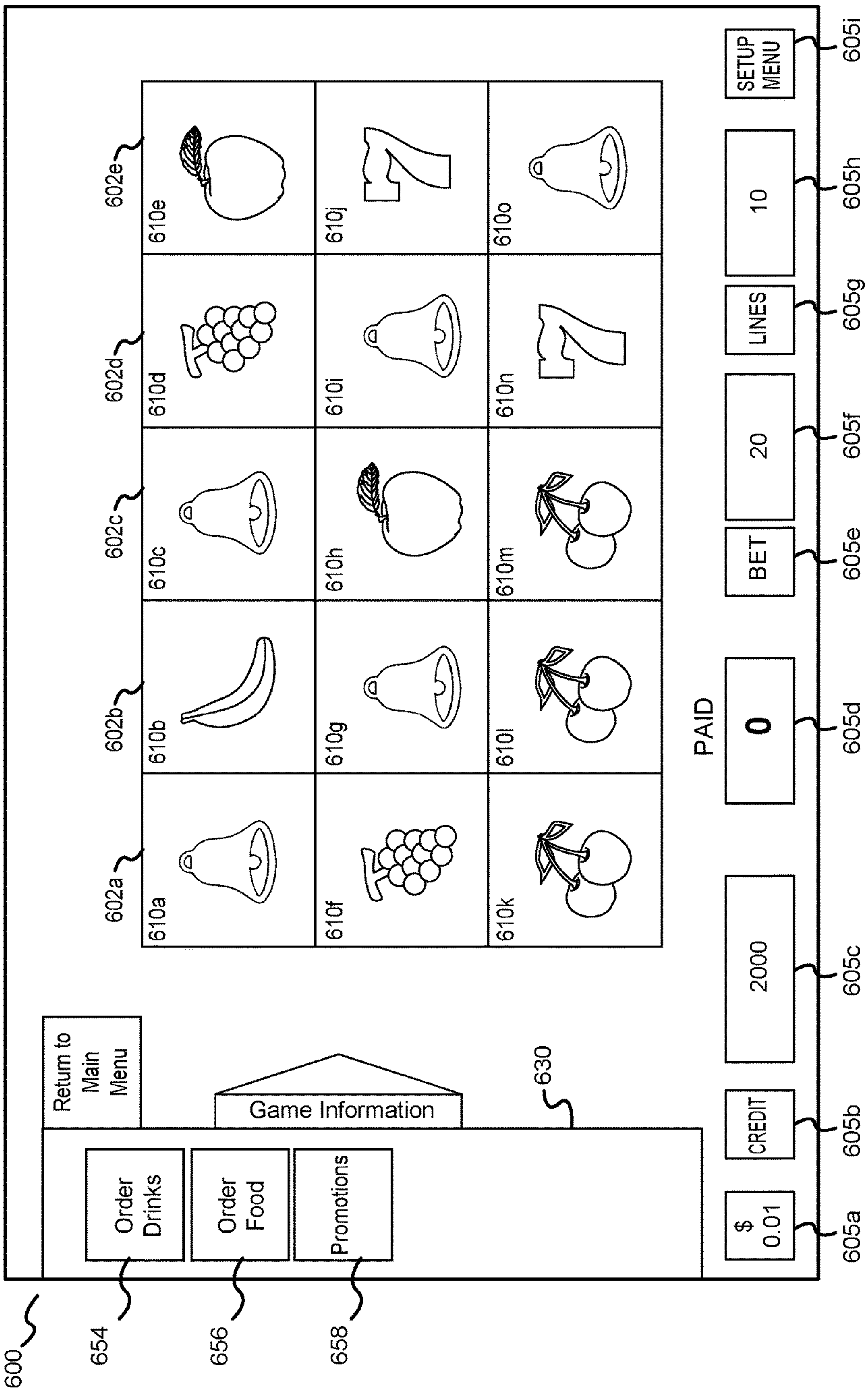

As illustrated in FIG. 6E, the gaming system enables the player to make a number of selections such as Order Drinks 654, Order Food 656, and obtain information on Promotions 658. While not shown, if the gaming system detects a player selection of Promotions 658, the gaming system may contact the casino accounting servers 710 to obtain any promotions (e.g., show tickets, restaurant coupons, etc.) that the player may have been awarded. Similarly, if the gaming system detected that the player selected Order Drinks 654, Order Food 656, the gaming system may contact casino accounting servers 710 or some other servers to page waitstaff to take player's order. In some embodiments, the Order Drinks button 654 or Order Food button 656 may cause gaming system to display more windows or display areas (like the additional information area 538 in FIG. 5D) that enable selection of particular drink or food orders (e.g., alcohol soda, steak, sandwiches, etc.) without having to order the food or drink directly from waitstaff.

As noted above, gaming system may close the open slide out information area automatically at any suitable time after the player's selections are made or the player may select the Return to Main Menu button 642 as shown with cursor 640.

FIG. 7 illustrates a network diagram 700 of one embodiment of the gaming systems 730*a*, 730*b*, 730*c*, to 730*n* communicating over a network 720 with casino accounting servers 710. As discussed above, for some information or functions that are retrieved and display in the disclosed slide out information areas, gaming systems 730*a*-730*n* may retrieve information from a plurality of sources such as remote casino accounting server 710 and local storage 735*a*-735*n*. For example, the gaming systems 730*a*-730*n* may obtain player tracking information (card balance, free games, promotions, awards, etc.) from servers like casino accounting servers 710. This enables the same information to be available in the slide out information area no matter which gaming system 730*a*-730*n* the player uses to play games. In some embodiments, some sources of information are stored in one or more local storage devices such as 735*a*-735*n*. For example, storage device 735*a* may be a hard drive or a flash drive that stores game data 810, pay table data 820, and game help data 830 (such as shown in FIG. 8). In some embodiments, each gaming system 730*a*-703*n* may include a plurality of different storage devices 735*a*. Thus, in some embodiments, the gaming system 730*a*-730*n* may substantially simultaneously access multiple data sources to produce information for the slide out information area.

In some embodiments, as illustrated in FIG. 8, the locally stored information such as game data 810, pay table data 820, and game help data 830 are stored separately and in the same or different formats. For example, in some embodiments, game data 810 may be store in a custom data file whereas pay table data may be stored in an XML based file. Such separate data storage configurations enables a gaining system to obtain parallel access to different data sources. The parallel access to different data sources provides the benefit of faster access and reduces the amount of data that must be retrieved and accessed at the same time. For example, when a player starts a play of a game at gaming system 730*a*, the gaming system 730*a* may retrieve game data 810 from a local storage device 735*a* without accessing the pay table data 820. While the player plays the game associated with game data 810, the player decides to activate slide out information area to obtain symbol pay data. Upon an appropriate request for symbol pay table information, the gaming system 730*a* may retrieve a smaller data source (pay table data 820) from storage device 735*a*. In this manner, the gaming system 730*a* did not retrieve both game data 810 and player data 820 when the data was not required, creating a more efficient use of the hardware resources of gaming system 730*a*.

It should therefore be appreciated that the slide out information area creates a new and more efficient, way to provide game information and offer services to players without distracting players from playing games. As players become more familiar with games in conjunction with using the slide out information, the players learn to better appreciate how the games are played, which adds a new level of anticipation and excitement for game players.

A number of embodiments of the invention have been described. Various modifications may be made without departing from the spirit and scope of the invention. For example, various forms of the flows shown above may be used, with steps re-ordered, added, or removed. Accordingly, other embodiments are within the scope of the following claims.

I claim:

1. A gaming system comprising:

a cabinet;

a processor;

a display device supported by the cabinet;

an input device supported by the cabinet;

a value acceptor supported by the cabinet;

a value dispenser supported by the cabinet;

a memory device that stores a plurality of instructions which, when executed by the processor, cause the processor to:

establish a credit balance based at least in part on a monetary value received by the value acceptor;

place a wager following receipt of a wager input via an input device, the credit balance being decreased by the wager;

cause the display device to display a game display comprising a plurality of symbol display areas for a play of a game;

receive a request to display information during the play of the game;

display, on the display device, a plurality of randomly generated symbols from a set of symbols;

display, on the display device, the requested information during the play of the game in the game display apart from the symbol display areas, wherein the requested information comprises a plurality of selectable symbols, wherein at least one of the selectable symbols comprises a symbol from the set of symbols, and wherein the requested information is visible between while the plurality of randomly generated symbols are being generated and while the plurality of randomly generated symbols are being displayed;

determine any credit awards based on symbols generated for the symbol display area and the wager;

cause the display device to display any determined awards, the credit balance being increased by any determined awards; and issue value from the value dispenser based on the credit balance upon receipt of a cash out signal.

2. The gaming system of claim 1, wherein the requested information is displayed in a slide out information area on the display device.

3. The gaming system of claim 2, wherein the slide out information area is displayed on the display device to the left of the game.

4. The gaming system of claim 2, wherein the slide out information area is displayed on the display device above the game.

5. The gaming system of claim 2, wherein the slide out information area is displayed on the display device on at least two sides around a periphery of the game.

6. The gaming system of claim 2, wherein the processor further determines dimensions of space available around each side of the display device around a periphery of the game.

7. The gaming system of claim 6, wherein the processor determines the side around the periphery of the game to use to display the slide out information area based on the determined dimensions of the space available.

8. The gaming system of claim 2, wherein the slide out information area displays symbol pay table information.

9. The gaming system of claim 2, wherein the slide out information area displays game information.

10. The gaming system of claim 2, wherein the slide out information area displays a second game that can be played simultaneously or at different times from the game.

11. The gaming system of claim 2, wherein the input device is a touch screen and the slide out information area is activated based upon a swipe detected by the touch screen.

12. The gaming system of claim 2, wherein the slide out information area displays symbol pay table information for every symbol from the set of symbols in the game.

13. The gaming system of claim 2, wherein the slide out information area displays symbol pay table information for a subset of the set of symbols in the game.

14. The gaming system of claim 13, wherein undisplayed symbols from the set of symbols are accessed in the slide out information area by scrolling through the undisplayed symbols based in part on the input device.

15. The gaming system of claim 8, wherein when the slide out information area displays a plurality of symbol pay table information, the processor further displays pay table information for at least two symbols simultaneously.

16. The gaming system of claim 2, wherein when the slide out information area is open, the processor automatically closes the slide out information area after a predetermined period of time.

17. The gaming system of claim 2, wherein when the slide out information area is open, the game remains substantially visible.

18. A method of operating a gaming system, the method comprising:

receiving, by a monetary value acceptor, a monetary value;

establishing, by a processor of the gaming system, a credit balance based at least in part on the received monetary value;

accepting, from an input device in a housing of the gaming system, a wager amount;

decreasing, by the processor, the credit balance by the wager amount;

displaying, on a display device of the housing, a game display comprising a plurality of symbol display areas for a play of a game;

receiving, from the input device, a request to display information during the play of the game;

displaying, on the display device, a plurality of randomly generated symbols from a set of symbols;

displaying, on the display device, the requested information during the play of the game in the game display apart from the symbol display areas, wherein the requested information comprises a plurality of selectable symbols, wherein at least one of the selectable symbols comprises a symbol from the set of symbols, and wherein the requested information is visible between while the plurality of randomly generated symbols are being generated and while the plurality of randomly generated symbols are being displayed;

displaying, on the display device, any determined awards;

increasing, by the processor, the credit balance by any determined awards; and issuing another monetary value, by the value dispenser, based on the credit balance upon receipt of a cash out signal.

19. A non-transitory computer-readable storage medium having machine instructions stored therein, the instructions being executable by a processor to cause the processor to:

establish a credit balance based at least in part on a monetary value received by a value acceptor of a gaming device;

place a wager following receipt of a wager input via an input device, the credit balance being decreased by the wager;

cause a display device to display a game display comprising a plurality of symbol display areas for a play of a game;

receive, from an input device, a request to display information during the play of the game;

display, on the display device, a plurality of randomly generated symbols from a set of symbols;

display, on the display device, the requested information during the play of the game in the game display apart from the symbol display areas, wherein the requested information comprises a plurality of selectable symbols, wherein at least one of the selectable symbols comprises a symbol from the set of symbols, and wherein the requested information is visible between while the plurality of randomly generated symbols are being generated and while the plurality of randomly generated symbols are being displayed;

cause the display device to display any determined awards, the credit balance being increased by any determined awards; and issue value from a value dispenser based on the credit balance upon receipt of a cash out signal.

* * * * *